United States Patent
Yang et al.

(10) Patent No.: US 9,774,481 B2
(45) Date of Patent: Sep. 26, 2017

(54) SYSTEMS AND METHODS FOR TRANSMITTING PILOT TONES

(71) Applicant: QUALCOMM Incorporated, San Diego, CA (US)

(72) Inventors: Lin Yang, San Diego, CA (US); Didier Johannes Richard Van Nee, De Meern (NL); Hemanth Sampath, San Diego, CA (US); Sameer Vermani, San Diego, CA (US); Tao Tian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 61 days.

(21) Appl. No.: 13/706,816

(22) Filed: Dec. 6, 2012

(65) Prior Publication Data

US 2013/0266086 A1 Oct. 10, 2013

Related U.S. Application Data

(60) Provisional application No. 61/620,865, filed on Apr. 5, 2012, provisional application No. 61/669,496, filed on Jul. 9, 2012, provisional application No. 61/699,777, filed on Sep. 11, 2012, provisional application No. 61/719,316, filed on Oct. 26, 2012.

(51) Int. Cl.
  *H04L 27/10* (2006.01)
  *H04L 5/00* (2006.01)

(52) U.S. Cl.
  CPC ............ *H04L 27/10* (2013.01); *H04L 5/0048* (2013.01)

(58) Field of Classification Search
  CPC ... H04L 5/0048; H04L 5/003; H04L 27/2666; H04L 27/2675
  See application file for complete search history.

(56) References Cited

U.S. PATENT DOCUMENTS 8,270,517 B2   9/2012   Van Zelst et al.
2005/0101259 A1   5/2005   Tong et al.
(Continued)

FOREIGN PATENT DOCUMENTS

CN   101313548 A   11/2008
JP   2009534982 A   9/2009
(Continued)

OTHER PUBLICATIONS

IEEE 802.11-12/1322r0, (Porat et al, Broadcom, Qualcomm, Intel Corp, Marvell, LG Electronics, Broadcom, ZTE, Samsung, ETRI, Nokia and Panasonic, I2R, Huawei, MediaTek, Renesas Mobile, STMicroelectronics, Nov. 2012).*

(Continued)

*Primary Examiner* — Aristocratis Fotakis
(74) *Attorney, Agent, or Firm* — Eric Ho

(57) ABSTRACT

Systems and methods for using travelling pilots for channel estimation are described herein. In one aspect, wireless communications apparatus is described that comprises a processor configured to divide a plurality of tones on which pilot signals are to be transmitted among a plurality of symbols, wherein each symbol includes less than all of the plurality of tones and the plurality of symbols includes at least a subset of the plurality of tones. The wireless communication apparatus further comprises a transmitter configured to transmit, during a given symbol, pilot signals on the tones included in the given symbol, wherein the tones over which the pilot signals are transmitted are changed from symbol to symbol.

31 Claims, 40 Drawing Sheets

(56) References Cited

U.S. PATENT DOCUMENTS

| | | |
|---|---|---|
| 2006/0172704 A1 | 8/2006 | Nishio et al. |
| 2007/0070944 A1 | 3/2007 | Rinne et al. |
| 2009/0238289 A1 | 9/2009 | Sampath et al. |
| 2010/0329365 A1 | 12/2010 | Li et al. |
| 2011/0158348 A1 | 6/2011 | Ponnampalam et al. |
| 2011/0305296 A1* | 12/2011 | Van Nee .............. 375/295 |
| 2012/0087436 A1 | 4/2012 | Srinivasa et al. |
| 2012/0269142 A1* | 10/2012 | Porat et al. ............ 370/329 |
| 2012/0320889 A1* | 12/2012 | Zhang et al. ........... 370/338 |
| 2013/0208822 A1* | 8/2013 | Zhang et al. ........... 375/295 |
| 2013/0223359 A1* | 8/2013 | Kenney et al. .......... 370/329 |
| 2013/0315323 A1* | 11/2013 | Porat ..................... 375/260 |
| 2014/0010324 A1* | 1/2014 | Kenney ............. H04L 27/22 375/284 |
| 2014/0050254 A1* | 2/2014 | Azizi ............. H04L 27/2666 375/219 |
| 2014/0105123 A1* | 4/2014 | Kenney ........... H04W 72/0453 370/329 |

FOREIGN PATENT DOCUMENTS

| | | |
|---|---|---|
| JP | 2010011494 A | 1/2010 |
| JP | 2015513839 A | 5/2015 |
| WO | WO-2005053198 A2 | 6/2005 |
| WO | WO-2007123364 A1 | 11/2007 |
| WO | 2008089595 A1 | 7/2008 |
| WO | 2008118474 A2 | 10/2008 |
| WO | WO-2013122301 A1 | 8/2013 |
| WO | WO-2013130460 A1 | 9/2013 |

OTHER PUBLICATIONS

International Search Report and Written Opinion—PCT/US2013/034455—ISA/EPO—dated Jun. 26, 2013.

N/A: "France Telecom Ihp Ofdm Mode Definition ; 15-07-0766-00-003c-france-telecom-ihp-of dm—mode-definition", IEEE Draft; 15-07-0766-00-003C-France-Telecom-IHP-0FDM—Mode-Definition, IEEE-SA Mentor, Piscataway, NJ USA, vol. 802.153c, Jul. 17, 2007 (Jul. 17, 2007), pp. 1-21, XP017668780.

Ron Porat (BROADCOM): "Traveling Pilots, 11-12-1322-00-00ah-traveling-pilots", IEEE SA Mentor; 11-12-1322-00-00AH-Traveling-Pilots, IEEE-SA Mentor, Piscataway, NJ USA, vol. 802.11ah, Nov. 12, 2012 (Nov. 12, 2012), pp. 1-16, XP068040168.

Han S., et al., "Pilot Value Definitions", IEEE 802.11-12/0363r1, Mar. 12, 2012, pp. 1-12.

Park M., "Proposed Specification Framework for TGah", IEEE 802.11-yy/xxxxr05, Jan. 19, 2012, pp. 1-12.

Porat R., et al., "Traveling Pilots, IEEE 802.11-yy/xxxxr0", Nov. 12, 2012, pp. 1-8.

* cited by examiner

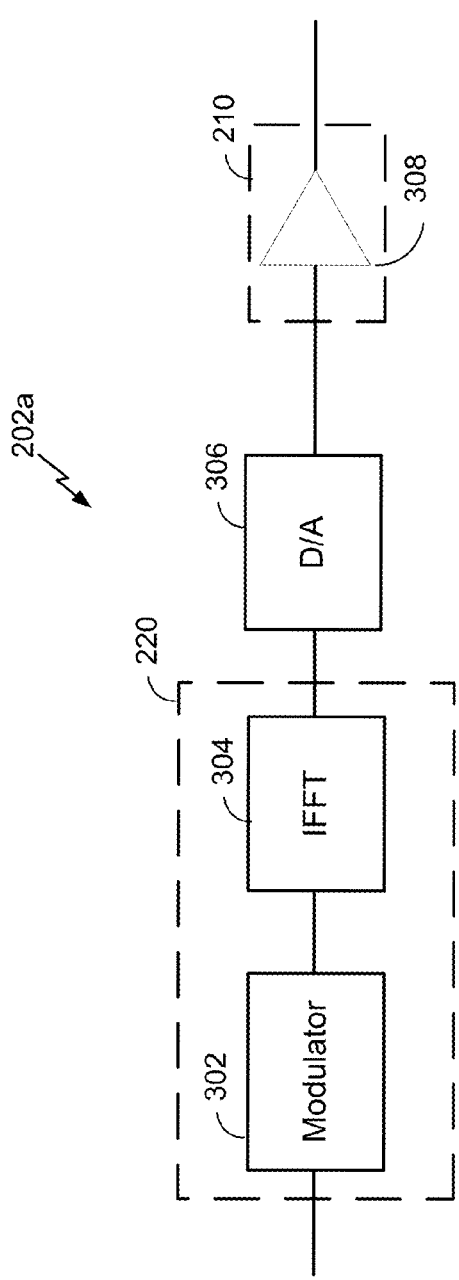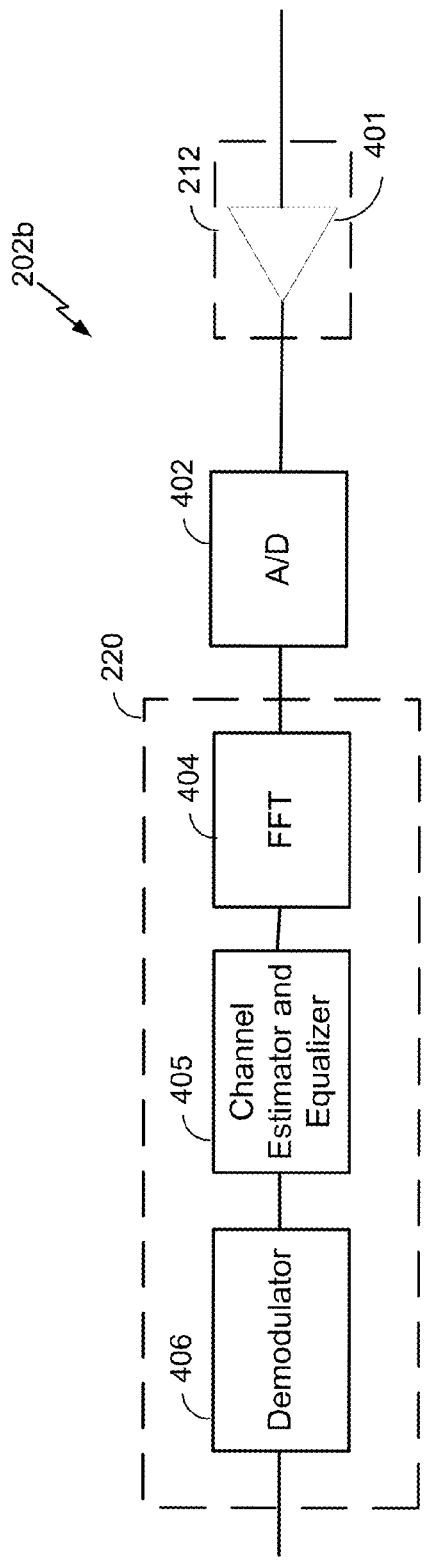

| Pilot Idx \ Subset Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -1 | -4 | -7 | -10 | -13 | -3 | -6 | -9 | -12 | -2 | -5 | -8 | -11 |
| 1 | 1 | 4 | 7 | 10 | 13 | 3 | 6 | 9 | 12 | 2 | 5 | 8 | 11 |

502a (columns 1-4), 502b (columns 5-8), 502c (columns 9-12)

FIG. 5

| PilotIdx \ SubsetIdx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -13 | -7 | -1 | -10 | -4 | -8 | -2 | -11 | -5 | -9 | -3 | -12 | -6 |
| 1 | 1 | 7 | 13 | 4 | 10 | 6 | 12 | 3 | 9 | 5 | 11 | 2 | 8 |

FIG. 5A

| Pilot Idx \ Subset Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -7 | -2 | -10 | -5 | -13 | -8 | -3 | -11 | -6 | -1 | -9 | -4 | -12 |
| 1 | 7 | 12 | 4 | 9 | 1 | 6 | 11 | 3 | 8 | 13 | 5 | 10 | 2 |

FIG. 5B

| Pilot Idx \ Subset Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -7 | -1 | -10 | -4 | -8 | -2 | -11 | -5 | -9 | -3 | -12 | -6 | -13 |
| 1 | 7 | 13 | 4 | 10 | 6 | 12 | 3 | 9 | 5 | 11 | 2 | 8 | 1 |

FIG. 5C

| Pilot Idx \ Pattern Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -2 | -10 | -5 | -13 | -8 | -3 | -11 | -6 | -1 | -9 | -4 | -12 | -7 |
| 1 | 12 | 4 | 9 | 1 | 6 | 11 | 3 | 8 | 13 | 5 | 10 | 2 | 7 |

FIG. 5D

| Pilot Idx \ Pattern Idx | 0 | 1 | 2 | 3 | 4 | 5 | 6 |
|---|---|---|---|---|---|---|---|
| 0 | -7 | -3 | -13 | -9 | -5 | -1 | -11 |
| 1 | 7 | 11 | 1 | 5 | 9 | 13 | 3 |

FIG. 5E

| Pilot Idx \ Pattern Idx | 0 | 1 | 2 | 3 | 4 | 5 | 6 |
|---|---|---|---|---|---|---|---|
| 0 | -3 | -13 | -9 | -5 | -1 | -11 | -7 |
| 1 | 11 | 1 | 5 | 9 | 13 | 3 | 7 |

FIG. 5F

| Pilot Idx \ Subset Idx | 0 | 1 | 2 | 3 | 4 | 5 | 6 | 7 | 8 | 9 | 10 | 11 | 12 | 13 | 0 |
|---|---|---|---|---|---|---|---|---|---|---|---|---|---|---|---|
| 0 | -15 | -18 | -21 | -24 | -27 | -16 | -19 | -22 | -25 | -28 | -17 | -20 | -23 | -26 | 0 |
| 1 | -1 | -4 | -7 | -10 | -13 | -2 | -5 | -8 | -11 | -14 | -3 | -6 | -9 | -12 | -15 |
| 2 | 1 | 4 | 7 | 10 | 13 | 2 | 5 | 8 | 11 | 14 | 3 | 6 | 9 | 12 | 1 |
| 3 | 15 | 18 | 21 | 24 | 27 | 16 | 19 | 22 | 25 | 28 | 17 | 20 | 23 | 26 | 15 |

602a: columns 0–4; 602b: columns 5–9; 602c: columns 10–13

FIG. 6

| PilotIdx \ SubsetIdx | 0 | 1 | 2 | 3 | 4 | 5 | 6 | 7 | 8 | 9 | 10 | 11 | 12 | 13 | 0 |
|---|---|---|---|---|---|---|---|---|---|---|---|---|---|---|---|
| 0 | -28 | -22 | -16 | -25 | -19 | -27 | -21 | -15 | -24 | -18 | -23 | -17 | -26 | -20 | -28 |
| 1 | -14 | -8 | -2 | -11 | -5 | -13 | -7 | -1 | -10 | -4 | -9 | -3 | -12 | -6 | -14 |
| 2 | 1 | 7 | 13 | 4 | 10 | 2 | 8 | 14 | 5 | 11 | 6 | 12 | 3 | 9 | 1 |
| 3 | 15 | 21 | 27 | 18 | 24 | 16 | 22 | 28 | 19 | 25 | 20 | 26 | 17 | 23 | 15 |

FIG. 6A

| Pilot Idx \ Subset Idx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | -21 | -16 | -11 | -6 | -1 | -24 | -19 | -14 | -9 | -4 | -27 | -22 | -17 | -12 |
| 1 | -7 | -2 | -25 | -20 | -15 | -10 | -5 | -28 | -23 | -18 | -13 | -8 | -3 | -26 |
| 2 | 7 | 12 | 17 | 22 | 27 | 4 | 9 | 14 | 19 | 24 | 1 | 6 | 11 | 16 |
| 3 | 21 | 26 | 3 | 8 | 13 | 18 | 23 | 28 | 5 | 10 | 15 | 20 | 25 | 2 |

FIG. 6B

| Pilot Idx \ Subset Idx | 0 | 1 | 2 | 3 | 4 | 5 | 6 | 7 | 8 | 9 | 10 | 11 | 12 | 13 | 0 |
|---|---|---|---|---|---|---|---|---|---|---|---|---|---|---|---|
| 0 | -28 | -22 | -16 | -25 | -19 | -27 | -21 | -15 | -24 | -18 | -23 | -17 | -26 | -20 | -28 |
| 1 | -14 | -8 | -2 | -11 | -5 | -13 | -7 | -1 | -10 | -4 | -9 | -3 | -12 | -6 | -14 |
| 2 | 1 | 7 | 13 | 4 | 10 | 2 | 8 | 14 | 5 | 11 | 6 | 12 | 3 | 9 | 1 |
| 3 | 15 | 21 | 27 | 18 | 24 | 16 | 22 | 28 | 19 | 25 | 20 | 26 | 17 | 23 | 15 |

FIG. 6C

| Pilot Idx \ Pattern Idx | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | -16 | -11 | -6 | -1 | -24 | -19 | -14 | -9 | -4 | -27 | -22 | -17 | -12 | -21 |
| 1 | -2 | -25 | -20 | -15 | -10 | -5 | -28 | -23 | -18 | -13 | -8 | -3 | -26 | -7 |
| 2 | 12 | 17 | 22 | 27 | 4 | 9 | 14 | 19 | 24 | 1 | 6 | 11 | 16 | 7 |
| 3 | 26 | 3 | 8 | 13 | 18 | 23 | 28 | 5 | 10 | 15 | 20 | 25 | 2 | 21 |

FIG. 6D

| Pilot Idx \ Pattern Idx | 0 | 1 | 2 | 3 | 4 | 5 | 6 |
|---|---|---|---|---|---|---|---|
| 0 | -21 | -17 | -13 | -9 | -5 | -1 | -25 |
| 1 | -7 | -3 | -27 | -23 | -19 | -15 | -11 |
| 2 | 7 | 11 | 15 | 19 | 23 | 27 | 3 |
| 3 | 21 | 25 | 1 | 5 | 9 | 13 | 17 |

FIG. 6E

| Pilot Idx \ Pattern Idx | 0 | 1 | 2 | 3 | 4 | 5 | 6 |
|---|---|---|---|---|---|---|---|
| 0 | -17 | -13 | -9 | -5 | -1 | -25 | -21 |
| 1 | -3 | -27 | -23 | -19 | -15 | -11 | -7 |
| 2 | 11 | 15 | 19 | 23 | 27 | 3 | 7 |
| 3 | 25 | 1 | 5 | 9 | 13 | 17 | 21 |

FIG. 6F

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| | | | | | | | | | | | | | | | | 0 | -40 | -21 | -2 | 2 | 21 | 40 |
| 0 | -40 | -44 | -48 | -52 | -56 | -42 | -46 | -50 | -54 | -58 | -41 | -45 | -49 | -53 | -57 | -43 | -47 | -51 | -55 |
| 1 | -21 | -25 | -29 | -33 | -37 | -23 | -27 | -31 | -35 | -39 | -22 | -26 | -30 | -34 | -38 | -24 | -28 | -32 | -36 |
| 2 | -2 | -6 | -10 | -14 | -18 | -4 | -8 | -12 | -16 | -20 | -3 | -7 | -11 | -15 | -19 | -5 | -9 | -13 | -17 |
| 3 | 2 | 6 | 10 | 14 | 18 | 4 | 8 | 12 | 16 | 20 | 3 | 7 | 11 | 15 | 19 | 5 | 9 | 13 | 17 |
| 4 | 21 | 25 | 29 | 33 | 37 | 23 | 27 | 31 | 35 | 39 | 22 | 26 | 30 | 34 | 38 | 24 | 28 | 32 | 36 |
| 5 | 40 | 44 | 48 | 52 | 56 | 42 | 46 | 50 | 54 | 58 | 41 | 45 | 49 | 53 | 57 | 43 | 47 | 51 | 55 |

702a: columns 1–4; 702b: columns 5–9; 702c: columns 10–14; 702d: columns 15–18

FIG. 7

| SubsetIdx \ PilotIdx | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| 0 | -58 | -50 | -42 | -54 | -46 | -56 | -48 | -40 | -52 | -44 | -53 | -45 | -57 | -49 | -41 | -51 | -43 | -55 | -47 |
| 1 | -39 | -31 | -23 | -35 | -27 | -37 | -29 | -21 | -33 | -25 | -34 | -26 | -38 | -30 | -22 | -32 | -24 | -36 | -28 |
| 2 | -20 | -12 | -4 | -16 | -8 | -18 | -10 | -2 | -14 | -6 | -15 | -7 | -19 | -11 | -3 | -13 | -5 | -17 | -9 |
| 3 | 2 | 10 | 18 | 6 | 14 | 4 | 12 | 20 | 8 | 16 | 7 | 15 | 3 | 11 | 19 | 9 | 17 | 5 | 13 |
| 4 | 21 | 29 | 37 | 25 | 33 | 23 | 31 | 39 | 27 | 35 | 26 | 34 | 22 | 30 | 38 | 28 | 36 | 24 | 32 |
| 5 | 40 | 48 | 56 | 44 | 52 | 42 | 50 | 58 | 46 | 54 | 45 | 53 | 41 | 49 | 57 | 47 | 55 | 43 | 51 |

FIG. 7A

| SubsetIdx \ PilotIdx | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| 0 | -49 | -41 | -33 | -25 | -17 | -9 | -58 | -50 | -42 | -34 | -26 | -18 | -10 | -2 | -51 | -43 | -35 | -27 | -19 |
| 1 | -30 | -22 | -14 | -6 | -55 | -47 | -39 | -31 | -23 | -15 | -7 | -56 | -48 | -40 | -32 | -24 | -16 | -8 | -57 |
| 2 | -11 | -3 | -52 | -44 | -36 | -28 | -20 | -12 | -4 | -53 | -45 | -37 | -29 | -21 | -13 | -5 | -54 | -46 | -38 |
| 3 | 11 | 19 | 27 | 35 | 43 | 51 | 2 | 10 | 18 | 26 | 34 | 42 | 50 | 58 | 9 | 17 | 25 | 33 | 41 |
| 4 | 30 | 38 | 46 | 54 | 5 | 13 | 21 | 29 | 37 | 45 | 53 | 4 | 12 | 20 | 28 | 36 | 44 | 52 | 3 |
| 5 | 49 | 57 | 8 | 16 | 24 | 32 | 40 | 48 | 56 | 7 | 15 | 23 | 31 | 39 | 47 | 55 | 6 | 14 | 22 |

FIG. 7B

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | |
|---|---|---|---|---|---|---|---|---|---|---|---|---|---|---|---|---|---|---|---|---|
| 0 | -58 | -50 | -42 | -54 | -46 | -56 | -48 | -40 | -52 | -44 | -53 | -45 | -57 | -49 | -41 | -51 | -43 | -55 | -47 | 0 |
| 1 | -39 | -31 | -23 | -35 | -27 | -37 | -29 | -21 | -33 | -25 | -34 | -26 | -38 | -30 | -22 | -32 | -24 | -36 | -28 | -58 |
| 2 | -20 | -12 | -4 | -16 | -8 | -18 | -10 | -2 | -14 | -6 | -15 | -7 | -19 | -11 | -3 | -13 | -5 | -17 | -9 | -39 |
| 3 | 2 | 10 | 18 | 6 | 14 | 4 | 12 | 20 | 8 | 16 | 7 | 15 | 3 | 11 | 19 | 9 | 17 | 5 | 13 | -20 |
| 4 | 21 | 29 | 37 | 25 | 33 | 23 | 31 | 39 | 27 | 35 | 26 | 34 | 22 | 30 | 38 | 28 | 36 | 24 | 32 | 2 |
| 5 | 40 | 48 | 56 | 44 | 52 | 42 | 50 | 58 | 46 | 54 | 45 | 53 | 41 | 49 | 57 | 47 | 55 | 43 | 51 | 21 |

FIG. 7C

| Pattern Idx / Pilot Idx | 0 | 1 | 2 | 3 | 4 | 5 | 6 | 7 | 8 | 9 |
|---|---|---|---|---|---|---|---|---|---|---|
| 0 | -50 | -44 | -38 | -32 | -26 | -20 | -14 | -8 | -2 | -56 |
| 1 | -30 | -24 | -18 | -12 | -6 | -60(-2) | -54 | -48 | -42 | -36 |
| 2 | -10 | -4 | -58 | -52 | -46 | -40 | -34 | -28 | -22 | -16 |
| 3 | 10 | 16 | 22 | 28 | 34 | 40 | 46 | 52 | 58 | 4 |
| 4 | 30 | 36 | 42 | 48 | 54 | 0(2) | 6 | 12 | 18 | 24 |
| 5 | 50 | 56 | 2 | 8 | 14 | 20 | 26 | 32 | 38 | 44 |

FIG. 7D

| Pattern Idx<br>Pilot Idx | 0 | 1 | 2 | 3 | 4 |
|---|---|---|---|---|---|
| 0 | -50 | -42 | -34 | -26 | -18 |
| 1 | -30 | -22 | -14 | -6 | -58 |
| 2 | -10 | -2 | -54 | -46 | -38 |
| 3 | 10 | 18 | 26 | 34 | 42 |
| 4 | 30 | 38 | 46 | 54 | 2 |
| 5 | 50 | 58 | 6 | 14 | 22 |

FIG. 7E

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | -94 | -98 | 102 | 106 | 110 | 114 | 118 | 122 | -96 | 100 | 104 | 108 | 112 | 116 | 120 | 122 | -95 | -99 | 103 | 107 | 111 | 115 | 119 | 122 | -97 | 101 | 105 | 109 | 113 | 117 | 121 |
| 1 | -63 | -67 | -71 | -75 | -79 | -83 | -87 | -91 | -65 | -69 | -73 | -77 | -81 | -85 | -89 | -93 | -64 | -68 | -72 | -76 | -80 | -84 | -88 | -92 | -66 | -70 | -74 | -78 | -82 | -86 | -90 |
| 2 | -32 | -36 | -40 | -44 | -48 | -52 | -56 | -60 | -34 | -38 | -42 | -46 | -50 | -54 | -58 | -62 | -33 | -37 | -41 | -45 | -49 | -53 | -57 | -61 | -35 | -39 | -43 | -47 | -51 | -55 | -59 |
| 3 | -2 | -5 | -9 | -13 | -17 | -21 | -25 | -29 | -3 | -7 | -11 | -15 | -19 | -23 | -27 | -31 | -2 | -6 | -10 | -14 | -18 | -22 | -26 | -30 | -4 | -8 | -12 | -16 | -20 | -24 | -28 |
| 4 | 2 | 5 | 9 | 13 | 17 | 21 | 25 | 29 | 3 | 7 | 11 | 15 | 19 | 23 | 27 | 31 | 2 | 6 | 10 | 14 | 18 | 22 | 26 | 30 | 4 | 8 | 12 | 16 | 20 | 24 | 28 |
| 5 | 32 | 36 | 40 | 44 | 48 | 52 | 56 | 60 | 34 | 38 | 42 | 46 | 50 | 54 | 58 | 62 | 33 | 37 | 41 | 45 | 49 | 53 | 57 | 61 | 35 | 39 | 43 | 47 | 51 | 55 | 59 |
| 6 | 63 | 67 | 71 | 75 | 79 | 83 | 87 | 91 | 65 | 69 | 73 | 77 | 81 | 85 | 89 | 93 | 64 | 68 | 72 | 76 | 80 | 84 | 88 | 92 | 66 | 70 | 74 | 78 | 82 | 86 | 90 |
| 7 | 94 | 98 | 102 | 106 | 110 | 114 | 118 | 122 | 96 | 100 | 104 | 108 | 112 | 116 | 120 | 122 | 95 | 99 | 103 | 107 | 111 | 115 | 119 | 122 | 97 | 101 | 105 | 109 | 113 | 117 | 121 |

| Subset Idx \ PilotIdx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | -104 | -91 | -78 | -65 | -52 | -39 | -26 | -13 | -122 | -111 | -98 | -85 | -72 | -59 | -46 | -33 | -20 | -7 | -118 | -105 | -92 | -79 | -66 | -53 | -40 | -27 | -14 | -2 | -112 | -99 | -86 |
| 1 | -73 | -60 | -47 | -34 | -21 | -8 | -119 | -106 | -93 | -80 | -67 | -54 | -41 | -28 | -15 | -2 | -113 | -100 | -87 | -74 | -61 | -48 | -35 | -22 | -9 | -120 | -107 | -94 | -81 | -68 | -55 |
| 2 | -42 | -29 | -16 | -3 | -114 | -101 | -88 | -75 | -62 | -49 | -36 | -23 | -10 | -121 | -108 | -95 | -82 | -69 | -56 | -43 | -30 | -17 | -4 | -115 | -102 | -89 | -76 | -63 | -50 | -37 | -24 |
| 3 | -11 | -122 | -109 | -96 | -83 | -70 | -57 | -44 | -31 | -18 | -5 | -116 | -103 | -90 | -77 | -64 | -51 | -38 | -25 | -12 | -122 | -110 | -97 | -84 | -71 | -58 | -45 | -32 | -19 | -6 | -117 |
| 4 | 11 | 24 | 37 | 50 | 63 | 76 | 89 | 102 | 115 | 4 | 17 | 30 | 43 | 56 | 69 | 82 | 95 | 108 | 121 | 10 | 23 | 36 | 49 | 62 | 75 | 88 | 101 | 114 | 3 | 16 | 29 |
| 5 | 42 | 55 | 68 | 81 | 94 | 107 | 120 | 9 | 22 | 35 | 48 | 61 | 74 | 87 | 100 | 113 | 2 | 15 | 28 | 41 | 54 | 67 | 80 | 93 | 106 | 119 | 8 | 21 | 34 | 47 | 60 |
| 6 | 73 | 86 | 99 | 112 | 2 | 14 | 27 | 40 | 53 | 66 | 79 | 92 | 105 | 118 | 7 | 20 | 33 | 46 | 59 | 72 | 85 | 98 | 111 | 122 | 13 | 26 | 39 | 52 | 65 | 78 | 91 |
| 7 | 104 | 117 | 6 | 19 | 32 | 45 | 58 | 71 | 84 | 97 | 110 | 122 | 12 | 25 | 38 | 51 | 64 | 77 | 90 | 103 | 116 | 5 | 18 | 31 | 44 | 57 | 70 | 83 | 96 | 109 | 122 |

FIG. 8A

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 122 | 112 | 100 | 120 | 108 | -96 | 116 | 104 | 122 | 110 | -98 | 118 | 106 | -94 | 114 | 102 | 119 | 107 | -95 | 115 | 103 | 122 | 111 | -99 | 121 | 109 | -97 | 113 | 101 | 117 | 105 | 122 |
| 1 | -93 | -81 | -69 | -89 | -77 | -65 | -85 | -73 | -91 | -79 | -67 | -87 | -75 | -63 | -83 | -71 | -88 | -76 | -64 | -84 | -72 | -92 | -80 | -68 | -90 | -78 | -66 | -82 | -70 | -86 | -74 | -93 |
| 2 | -62 | -50 | -38 | -58 | -46 | -34 | -54 | -42 | -60 | -48 | -36 | -56 | -44 | -32 | -52 | -40 | -57 | -45 | -33 | -53 | -41 | -61 | -49 | -37 | -59 | -47 | -35 | -51 | -39 | -55 | -43 | -62 |
| 3 | -31 | -19 | -7 | -27 | -15 | -3 | -23 | -11 | -29 | -17 | -5 | -25 | -13 | -2 | -21 | -9 | -26 | -14 | -2 | -22 | -10 | -30 | -18 | -6 | -28 | -16 | -4 | -20 | -8 | -24 | -12 | -31 |
| 4 | 2 | 13 | 25 | 5 | 17 | 29 | 9 | 21 | 3 | 15 | 27 | 7 | 19 | 31 | 11 | 23 | 18 | 30 | 10 | 22 | 2 | 14 | 26 | 6 | 4 | 16 | 28 | 12 | 24 | 8 | 20 | 2 |
| 5 | 32 | 44 | 56 | 36 | 48 | 60 | 40 | 52 | 34 | 46 | 58 | 38 | 50 | 62 | 42 | 54 | 49 | 61 | 30 | 53 | 41 | 33 | 45 | 57 | 35 | 47 | 59 | 43 | 55 | 39 | 51 | 32 |
| 6 | 63 | 75 | 87 | 67 | 79 | 91 | 71 | 83 | 65 | 77 | 89 | 69 | 81 | 93 | 73 | 85 | 80 | 92 | 72 | 84 | 64 | 76 | 88 | 66 | 90 | 78 | 74 | 82 | 70 | 63 |
| 7 | 94 | 106 | 118 | 98 | 110 | 122 | 102 | 114 | 96 | 108 | 120 | 100 | 112 | 104 | 116 | 99 | 111 | 122 | 103 | 115 | 95 | 107 | 119 | 97 | 109 | 121 | 105 | 117 | 101 | 113 | 94 |

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | 107 | -94 | -81 | -68 | -55 | -42 | -29 | -16 | -3 | -3 | -98 | -85 | -72 | -59 | -46 | -33 | -20 | -3 | -98 | -89 | -76 | -63 | -50 | -37 | -24 | -11 | -11 | 119 | 106 | -93 | ... |
| 1 | -77 | -64 | -51 | -38 | -25 | -12 | 120 | 107 | -94 | 111 | -85 | -72 | -59 | -46 | -33 | -20 | -3 | -98 | -85 | -59 | -46 | -33 | -20 | -3 | -7 | 115 | 102 | -89 | -76 | -63 | ... |
| 2 | -47 | -34 | -21 | -8 | 116 | 103 | -90 | -77 | -64 | -51 | -68 | -55 | -42 | -29 | -16 | -3 | 111 | -85 | -72 | -59 | -46 | -33 | -20 | 111 | -98 | -85 | -72 | -59 | -46 | -33 | ... |
| 3 | -17 | -4 | 112 | -99 | -86 | -73 | -60 | -47 | -34 | -21 | -38 | -25 | -12 | 120 | 107 | -94 | -81 | -68 | -55 | -25 | -12 | 120 | 107 | -94 | -81 | -68 | -55 | -42 | -29 | -3 | ... |
| 4 | 17 | 30 | 43 | 56 | 69 | 82 | 95 | 108 | 121 | 13 | 26 | 39 | 52 | 65 | 78 | 91 | 104 | 117 | 9 | 9 | 22 | 48 | 61 | 74 | 87 | 100 | 113 | 22 | 35 | 31 | ... |
| 5 | 47 | 60 | 73 | 86 | 99 | 112 | 4 | 17 | 30 | 43 | 56 | 69 | 82 | 95 | 108 | 121 | 13 | 26 | 39 | 52 | 65 | 78 | 91 | 104 | 117 | 9 | 22 | 35 | 48 | 61 | ... |
| 6 | 77 | 90 | 103 | 116 | 8 | 21 | 34 | 47 | 60 | 73 | 86 | 99 | 112 | 4 | 17 | 30 | 43 | 56 | 69 | 82 | 95 | 108 | 121 | 13 | 26 | 39 | 52 | 65 | 78 | 91 | ... |
| 7 | 107 | 120 | 12 | 25 | 38 | 51 | 64 | 77 | 90 | 103 | 116 | 8 | 21 | 34 | 47 | 60 | 73 | 86 | 99 | 112 | 4 | 17 | 30 | 43 | 56 | 69 | 82 | 95 | 108 | 121 | ... |

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | 122 | 112 | 100 | 120 | 108 | -96 | 116 | 104 | 122 | 110 | -98 | 118 | 106 | -94 | 114 | 102 | 119 | 107 | -95 | 115 | 103 | 122 | 111 | -99 | 121 | 109 | -97 | 113 | 101 | 117 | 105 |
| 1 | -93 | -81 | -69 | -89 | -77 | -65 | -85 | -73 | -91 | -79 | -67 | -87 | -75 | -63 | -83 | -71 | -88 | -76 | -64 | -84 | -72 | -92 | -80 | -68 | -90 | -78 | -66 | -82 | -70 | -86 | -74 |
| 2 | -62 | -50 | -38 | -58 | -46 | -34 | -54 | -42 | -60 | -48 | -36 | -56 | -44 | -32 | -52 | -40 | -57 | -45 | -33 | -53 | -41 | -61 | -49 | -37 | -59 | -47 | -35 | -51 | -39 | -55 | -43 |
| 3 | -31 | -19 | -7 | -27 | -15 | -3 | -23 | -11 | -29 | -17 | -5 | -25 | -13 | -2 | -21 | -9 | -26 | -14 | -2 | -22 | -10 | -30 | -18 | -6 | -28 | -16 | -4 | -20 | -8 | -24 | -12 |
| 4 | 2 | 13 | 25 | 5 | 17 | 29 | 9 | 21 | 3 | 15 | 27 | 7 | 19 | 31 | 11 | 23 | 6 | 18 | 30 | 10 | 22 | 2 | 14 | 26 | 4 | 16 | 28 | 12 | 24 | 8 | 20 |
| 5 | 32 | 44 | 56 | 36 | 48 | 60 | 40 | 52 | 34 | 46 | 58 | 38 | 50 | 62 | 42 | 54 | 37 | 49 | 61 | 41 | 53 | 33 | 45 | 57 | 35 | 47 | 59 | 43 | 55 | 39 | 51 |
| 6 | 63 | 75 | 87 | 67 | 79 | 91 | 71 | 83 | 65 | 77 | 89 | 69 | 81 | 93 | 73 | 85 | 68 | 80 | 92 | 72 | 84 | 64 | 76 | 88 | 66 | 78 | 90 | 74 | 86 | 70 | 82 |
| 7 | 94 | 106 | 118 | 98 | 110 | 122 | 102 | 114 | 96 | 108 | 120 | 100 | 112 | 122 | 104 | 116 | 99 | 111 | 122 | 103 | 115 | 95 | 107 | 119 | 97 | 109 | 121 | 105 | 117 | 101 | 113 |

FIG. 8D

| Subset Idx \ Pilot Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | -112 | -102 | -92 | -82 | -72 | -62 | -52 | -42 | -32 | -22 | -12 | -2 | -120 | -110 | -100 | -90 |
| 1 | -80 | -70 | -60 | -50 | -40 | -30 | -20 | -10 | 0(-2) | -118 | -108 | -98 | -88 | -78 | -68 | -58 |
| 2 | -48 | -38 | -28 | -18 | -8 | -126 (-122) | -116 | -106 | -96 | -86 | -76 | -66 | -56 | -46 | -36 | -26 |
| 3 | -16 | -6 | -124 (-122) | -114 | -104 | -94 | -84 | -74 | -64 | -54 | -44 | -34 | -24 | -14 | -4 | -122 |
| 4 | 16 | 26 | 36 | 46 | 56 | 66 | 76 | 86 | 96 | 106 | 116 | 126 (122) | 8 | 18 | 28 | 38 |
| 5 | 48 | 58 | 68 | 78 | 88 | 98 | 108 | 118 | 0(2) | 10 | 20 | 30 | 40 | 50 | 60 | 70 |
| 6 | 80 | 90 | 100 | 110 | 120 | 2 | 12 | 22 | 32 | 42 | 52 | 62 | 72 | 82 | 92 | 102 |
| 7 | 112 | 122 | 4 | 14 | 24 | 34 | 44 | 54 | 64 | 74 | 84 | 94 | 104 | 114 | 124 (122) | 6 |

| Subset Idx \ Pilot Idx | 0 | 1 | 2 | 3 | 4 | 5 | 6 | 7 |
|---|---|---|---|---|---|---|---|---|
| 0 | -112 | -100 | -88 | -76 | -64 | -52 | -40 | -28 |
| 1 | -80 | -68 | -56 | -44 | -32 | -20 | -8 | -124 (-122) |
| 2 | -48 | -36 | -24 | -12 | 0 (-2) | -116 | -104 | -92 |
| 3 | -16 | -4 | -120 | -108 | -96 | -84 | -72 | -60 |
| 4 | 16 | 28 | 40 | 52 | 64 | 76 | 88 | 100 |
| 5 | 48 | 60 | 72 | 84 | 96 | 108 | 120 | 4 |
| 6 | 80 | 92 | 104 | 116 | 0 (2) | 12 | 24 | 36 |
| 7 | 112 | 124 (122) | 8 | 20 | 32 | 44 | 56 | 68 |

FIG. 8F

| Subset Idx / Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| 0 | -107 | -94 | -81 | -68 | -55 | -42 | -29 | -16 | -3 | -110 | -97 | -84 | -71 | -58 | -45 | -32 | -19 | -6 | -113 | -100 | -87 | -74 | -61 | -48 | -35 | -22 | -9 | -116 | -103 | -90 |
| 1 | -77 | -64 | -51 | -38 | -25 | -12 | -119 | -106 | -93 | -80 | -67 | -54 | -41 | -28 | -15 | -2 | -109 | -96 | -83 | -70 | -57 | -44 | -31 | -18 | -5 | -112 | -99 | -86 | -73 | -60 |
| 2 | -47 | -34 | -21 | -8 | -115 | -102 | -89 | -76 | -63 | -50 | -37 | -24 | -11 | -118 | -105 | -92 | -79 | -66 | -53 | -40 | -27 | -14 | -121 | -108 | -95 | -82 | -69 | -56 | -43 | -30 |
| 3 | -17 | -4 | -111 | -98 | -85 | -72 | -59 | -46 | -33 | -20 | -7 | -114 | -101 | -88 | -75 | -62 | -49 | -36 | -23 | -10 | -117 | -104 | -91 | -78 | -65 | -52 | -39 | -26 | -13 | 120 |
| 4 | 17 | 30 | 43 | 56 | 69 | 82 | 95 | 108 | 121 | 14 | 27 | 40 | 53 | 66 | 79 | 92 | 105 | 118 | 11 | 24 | 37 | 50 | 63 | 76 | 89 | 102 | 115 | 8 | 21 | 34 |
| 5 | 47 | 60 | 73 | 86 | 99 | 112 | 5 | 18 | 31 | 44 | 57 | 70 | 83 | 96 | 109 | 2 | 15 | 28 | 41 | 54 | 67 | 80 | 93 | 106 | 119 | 12 | 25 | 38 | 51 | 64 |
| 6 | 77 | 90 | 103 | 116 | 9 | 22 | 35 | 48 | 61 | 74 | 87 | 100 | 113 | 6 | 19 | 32 | 45 | 58 | 71 | 84 | 97 | 110 | 3 | 16 | 29 | 42 | 55 | 68 | 81 | 94 |
| 7 | 107 | 120 | 13 | 26 | 39 | 52 | 65 | 78 | 91 | 104 | 117 | 10 | 23 | 36 | 49 | 62 | 75 | 88 | 101 | 114 | 7 | 20 | 33 | 46 | 59 | 72 | 85 | 98 | 111 | 4 |

| Subset Idx \ Pilot Idx | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | -107 | -99 | -91 | -83 | -75 | -67 | -59 | -51 | -43 | -35 | -27 | -19 | -11 | -3 | -115 |
| 1 | -77 | -69 | -61 | -53 | -45 | -37 | -29 | -21 | -13 | -5 | -117 | -109 | -101 | -93 | -85 |
| 2 | -47 | -39 | -31 | -23 | -15 | -7 | -119 | -111 | -103 | -95 | -87 | -79 | -71 | -63 | -55 |
| 3 | -17 | -9 | -121 | -113 | -105 | -97 | -89 | -81 | -73 | -65 | -57 | -49 | -41 | -33 | -25 |
| 4 | 17 | 25 | 33 | 41 | 49 | 57 | 65 | 73 | 81 | 89 | 97 | 105 | 113 | 121 | 9 |
| 5 | 47 | 55 | 63 | 71 | 79 | 87 | 95 | 103 | 111 | 119 | 7 | 15 | 23 | 31 | 39 |
| 6 | 77 | 85 | 93 | 101 | 109 | 117 | 5 | 13 | 21 | 29 | 37 | 45 | 53 | 61 | 69 |
| 7 | 107 | 115 | 3 | 11 | 19 | 27 | 35 | 43 | 51 | 59 | 67 | 75 | 83 | 91 | 99 |

FIG. 8I

| Subset Idx \ Pilot Idx | 0 | 1 | 2 | 3 | 4 | 5 | 6 | 7 |
|---|---|---|---|---|---|---|---|---|
| 0 | -112 | -100 | -88 | -76 | -64 | -52 | -40 | -28 |
| 1 | -80 | -68 | -56 | -44 | -32 | -20 | -8 | -122 (-124) |
| 2 | -48 | -36 | -24 | -12 | -2 (0) | -116 | -104 | -92 |
| 3 | -16 | -4 | -120 | -108 | -96 | -84 | -72 | -60 |
| 4 | 16 | 28 | 40 | 52 | 64 | 76 | 88 | 100 |
| 5 | 48 | 60 | 72 | 84 | 96 | 108 | 120 | 4 |
| 6 | 80 | 92 | 104 | 116 | 2 (0) | 12 | 24 | 36 |
| 7 | 112 | 122 (124) | 8 | 20 | 32 | 44 | 56 | 68 |

FIG. 8J

| Subset Idx / Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | |
|---|---|---|---|---|---|---|---|---|---|---|---|---|---|---|---|---|---|---|---|---|---|---|---|---|---|---|---|---|---|---|---|---|
| 0 | -222 | 226 | 230 | 234 | 238 | 242 | 246 | -250 | 224 | 228 | 232 | 236 | 240 | 244 | 248 | -252 | 223 | 227 | 231 | 235 | 239 | 243 | 247 | -251 | 225 | 229 | 233 | 237 | 241 | 245 | 249 | -222 |
| 1 | -191 | 195 | 199 | 203 | 207 | 211 | 215 | 219 | 193 | 197 | 201 | 205 | 209 | 213 | 217 | 221 | 192 | 196 | 200 | 204 | 208 | 212 | 216 | 220 | 194 | 198 | 202 | 206 | 210 | 214 | 218 | 191 |
| 2 | -160 | 164 | 168 | 172 | 176 | 180 | 184 | 188 | 162 | 166 | 170 | 174 | 178 | 182 | 186 | 190 | 161 | 165 | 169 | 173 | 177 | 181 | 185 | 189 | 163 | 167 | 171 | 175 | 179 | 183 | 187 | 160 |
| 3 | -130 | 133 | 137 | 141 | 145 | 149 | 153 | 157 | 131 | 135 | 139 | 143 | 147 | 151 | 155 | 159 | -130 | 134 | 138 | 142 | 146 | 150 | 154 | 158 | 132 | 136 | 140 | 144 | 148 | 152 | 156 | 130 |
| 4 | -97 | 101 | 105 | 109 | 113 | 117 | 121 | 125 | -99 | 103 | 107 | 111 | 115 | 119 | 123 | -127 | -98 | 102 | 106 | 110 | 114 | 118 | 122 | -126 | 100 | 104 | 108 | 112 | 116 | 120 | 124 | -97 |
| 5 | -66 | -70 | -74 | -78 | -82 | -86 | -90 | -94 | -68 | -72 | -76 | -80 | -84 | -88 | -92 | -96 | -67 | -71 | -75 | -79 | -83 | -87 | -91 | -95 | -69 | -73 | -77 | -81 | -85 | -89 | -93 | -66 |
| 6 | -35 | -39 | -43 | -47 | -51 | -55 | -59 | -63 | -37 | -41 | -45 | -49 | -53 | -57 | -61 | -65 | -36 | -40 | -44 | -48 | -52 | -56 | -60 | -64 | -38 | -42 | -46 | -50 | -54 | -58 | -62 | -35 |
| 7 | -4 | -8 | -12 | -16 | -20 | -24 | -28 | -32 | -6 | -10 | -14 | -18 | -22 | -26 | -30 | -34 | -5 | -9 | -13 | -17 | -21 | -25 | -29 | -33 | -7 | -11 | -15 | -19 | -23 | -27 | -31 | -4 |
| 8 | 4 | 8 | 12 | 16 | 20 | 24 | 28 | 32 | 6 | 10 | 14 | 18 | 22 | 26 | 30 | 34 | 5 | 9 | 13 | 17 | 21 | 25 | 29 | 33 | 7 | 11 | 15 | 19 | 23 | 27 | 31 | 4 |
| 9 | 35 | 39 | 43 | 47 | 51 | 55 | 59 | 63 | 37 | 41 | 45 | 49 | 53 | 57 | 61 | 65 | 36 | 40 | 44 | 48 | 52 | 56 | 60 | 64 | 38 | 42 | 46 | 50 | 54 | 58 | 62 | 35 |
| 10 | 66 | 70 | 74 | 78 | 82 | 86 | 90 | 94 | 68 | 72 | 76 | 80 | 84 | 88 | 92 | 96 | 67 | 71 | 75 | 79 | 83 | 87 | 91 | 95 | 69 | 73 | 77 | 81 | 85 | 89 | 93 | 66 |
| 11 | 97 | 101 | 105 | 109 | 113 | 117 | 121 | 125 | 99 | 103 | 107 | 111 | 115 | 119 | 123 | 127 | 98 | 102 | 106 | 110 | 114 | 118 | 122 | 126 | 100 | 104 | 108 | 112 | 116 | 120 | 124 | 97 |
| 12 | 130 | 133 | 137 | 141 | 145 | 149 | 153 | 157 | 131 | 135 | 139 | 143 | 147 | 151 | 155 | 159 | 130 | 134 | 138 | 142 | 146 | 150 | 154 | 158 | 132 | 136 | 140 | 144 | 148 | 152 | 156 | 130 |
| 13 | 160 | 164 | 168 | 172 | 176 | 180 | 184 | 188 | 162 | 166 | 170 | 174 | 178 | 182 | 186 | 190 | 161 | 165 | 169 | 173 | 177 | 181 | 185 | 189 | 163 | 167 | 171 | 175 | 179 | 183 | 187 | 160 |
| 14 | 191 | 195 | 199 | 203 | 207 | 211 | 215 | 219 | 193 | 197 | 201 | 205 | 209 | 213 | 217 | 221 | 192 | 196 | 200 | 204 | 208 | 212 | 216 | 220 | 194 | 198 | 202 | 206 | 210 | 214 | 218 | 191 |
| 15 | 222 | 226 | 230 | 234 | 238 | 242 | 246 | 250 | 224 | 228 | 232 | 236 | 240 | 244 | 248 | 252 | 223 | 227 | 231 | 235 | 239 | 243 | 247 | 251 | 225 | 229 | 233 | 237 | 241 | 245 | 249 | 222 |

| Subset Idx / Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | -242 | 229 | 216 | 203 | 190 | 177 | 164 | 151 | 138 | 125 | 112 | -99 | -86 | -73 | -60 | -47 | -34 | -21 | -8 | 243 | 230 | 217 | 204 | 191 | 178 | 165 | 152 | 139 | 126 | 113 | 100 |
| 1 | -211 | 198 | 185 | 172 | 159 | 146 | 133 | 120 | 107 | -94 | -81 | -68 | -55 | -42 | -29 | -16 | -3 | 238 | 225 | 212 | 199 | 186 | 173 | 160 | 147 | 134 | 121 | 108 | -95 | -82 | -69 |
| 2 | -180 | 167 | 154 | 141 | -130 | 115 | 102 | -89 | -76 | -63 | -50 | -37 | -24 | -11 | 246 | 233 | 220 | 207 | 194 | 181 | 168 | 155 | 142 | -130 | 116 | 103 | -90 | -77 | -64 | -51 | -38 |
| 3 | -149 | 136 | 123 | 110 | -97 | -84 | -71 | -58 | -45 | -32 | -19 | -6 | 241 | 228 | 215 | 202 | 189 | 176 | 163 | 150 | 137 | 124 | 111 | -98 | -85 | -72 | -59 | -46 | -33 | -20 | -7 |
| 4 | -118 | 105 | -92 | -79 | -66 | -53 | -40 | -27 | -14 | 249 | 236 | 223 | 210 | 197 | 184 | 171 | 158 | 145 | 132 | 119 | 106 | -93 | -80 | -67 | -54 | -41 | -28 | -15 | -2 | 237 | 224 |
| 5 | -87 | -74 | -61 | -48 | -35 | -22 | -9 | 244 | 231 | 218 | 205 | 192 | 179 | 166 | 153 | 140 | 127 | 114 | 101 | -88 | -75 | -62 | -49 | -36 | -23 | -10 | 245 | 232 | 219 | 206 | 193 |
| 6 | -56 | -43 | -30 | -17 | -4 | 239 | 226 | 213 | 200 | 187 | 174 | 161 | 148 | 135 | 122 | 109 | -96 | -83 | -70 | -57 | -44 | -31 | -18 | -5 | 240 | 227 | 214 | 201 | 188 | 175 | 162 |
| 7 | -25 | -12 | 247 | 234 | 221 | 208 | 195 | 182 | 169 | 156 | 143 | 130 | 117 | 104 | -91 | -78 | -65 | -52 | -39 | -26 | -13 | 248 | 235 | 222 | 209 | 196 | 183 | 170 | 157 | 144 | 131 |
| 8 | 25 | 38 | 51 | 64 | 77 | 90 | 103 | 116 | -130 | 142 | 155 | 168 | 181 | 194 | 207 | 220 | 233 | 246 | 11 | 24 | 37 | 50 | 63 | 76 | 89 | 102 | 115 | -130 | 141 | 154 | 167 |
| 9 | 56 | 69 | 82 | 95 | 108 | 121 | 134 | 147 | 160 | 173 | 186 | 199 | 212 | 225 | 238 | -3 | 16 | 29 | 42 | 55 | 68 | 81 | 94 | 107 | 120 | 133 | 146 | 159 | 172 | 185 | 198 |
| 10 | 87 | 100 | 113 | 126 | 139 | 152 | 165 | 178 | 191 | 204 | 217 | 230 | 243 | 8 | 21 | 34 | 47 | 60 | 73 | 86 | 99 | 112 | 125 | 138 | 151 | 164 | 177 | 190 | 203 | 216 | 229 |
| 11 | 118 | 131 | 144 | 157 | 170 | 183 | 196 | 209 | 222 | 235 | 248 | 13 | 26 | 39 | 52 | 65 | 78 | 91 | 104 | 117 | 130 | 143 | 156 | 169 | 182 | 195 | 208 | 221 | 234 | 247 | 12 |
| 12 | 149 | 162 | 175 | 188 | 201 | 214 | 227 | 240 | -3 | 18 | 31 | 44 | 57 | 70 | 83 | 96 | 109 | 122 | 135 | 148 | 161 | 174 | 187 | 200 | 213 | 226 | 239 | -3 | 17 | 30 | 43 |
| 13 | 180 | 193 | 206 | 219 | 232 | 245 | 10 | 23 | 36 | 49 | 62 | 75 | 88 | 101 | 114 | -3 | 140 | 153 | 166 | 179 | 192 | 205 | 218 | 231 | 244 | 9 | 22 | 35 | 48 | 61 | 74 |
| 14 | 211 | 224 | 237 | 250 | 15 | 28 | 41 | 54 | 67 | 80 | 93 | 106 | 119 | 132 | 145 | 158 | 171 | 184 | 197 | 210 | 223 | 236 | 249 | 14 | 27 | 40 | 53 | 66 | 79 | 92 | 105 |
| 15 | 242 | 7 | 20 | 33 | 46 | 59 | 72 | 85 | 98 | 111 | 124 | 137 | 150 | 163 | 176 | 189 | 202 | 215 | 228 | 241 | 6 | 19 | 32 | 45 | 58 | 71 | 84 | 97 | 110 | 123 | 136 |

FIG. 9A

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | 250 | 240 | 228 | 248 | 236 | 224 | 244 | 232 | 250 | 238 | 226 | 246 | 234 | 222 | 242 | 230 | 247 | 235 | 223 | 243 | 231 | 250 | 239 | 227 | 249 | 237 | 225 | 241 | 229 | 245 | 233 |
| 1 | 221 | 209 | 197 | 217 | 205 | 193 | 213 | 201 | 250 | 207 | 195 | 215 | 203 | 191 | 211 | 199 | 216 | 204 | 192 | 212 | 200 | 220 | 208 | 196 | 218 | 206 | 194 | 210 | 198 | 214 | 202 |
| 2 | 190 | 178 | 166 | 186 | 174 | 162 | 182 | 170 | 188 | 176 | 164 | 184 | 172 | 160 | 180 | 168 | 185 | 173 | 161 | 181 | 169 | 189 | 177 | 165 | 187 | 175 | 163 | 179 | 167 | 183 | 171 |
| 3 | 159 | 147 | 135 | 155 | 143 | 131 | 151 | 139 | 157 | 145 | 133 | 153 | 141 | 130 | 149 | 137 | 154 | 142 | 130 | 150 | 138 | 158 | 146 | 134 | 156 | 144 | 132 | 148 | 136 | 152 | 140 |
| 4 | 128 | 115 | 103 | 123 | 111 | -99 | 119 | 107 | 125 | 113 | 101 | 121 | 109 | -97 | 117 | 105 | 122 | 110 | -98 | 118 | 106 | 126 | 114 | 102 | 124 | 112 | 100 | 116 | 104 | 120 | 108 |
| 5 | -96 | -84 | -72 | -92 | -80 | -68 | -88 | -76 | -94 | -82 | -70 | -90 | -78 | -66 | -86 | -74 | -91 | -79 | -67 | -87 | -75 | -95 | -83 | -71 | -93 | -81 | -69 | -85 | -73 | -89 | -77 |
| 6 | -65 | -53 | -41 | -61 | -49 | -37 | -57 | -45 | -63 | -51 | -39 | -59 | -47 | -35 | -55 | -43 | -60 | -48 | -36 | -56 | -44 | -64 | -52 | -40 | -62 | -50 | -38 | -54 | -42 | -58 | -46 |
| 7 | -34 | -22 | -10 | -30 | -18 | -6 | -26 | -14 | -32 | -20 | -8 | -28 | -16 | -4 | -24 | -12 | -29 | -17 | -5 | -25 | -13 | -33 | -21 | -9 | -31 | -19 | -7 | -23 | -11 | -27 | -15 |
| 8 | -3 | 16 | 28 | 8 | 20 | 32 | 12 | 24 | 6 | 18 | 30 | 10 | 22 | 34 | 14 | 26 | 21 | 33 | 21 | 13 | 25 | 0 | 17 | 29 | 7 | 19 | 31 | 15 | 27 | 11 | 23 |
| 9 | 35 | 47 | 59 | 39 | 51 | 63 | 43 | 55 | 37 | 49 | 61 | 41 | 53 | 65 | 45 | 57 | 52 | 64 | 44 | 56 | 36 | 48 | 60 | 38 | 50 | 62 | 46 | 58 | 42 | 54 |
| 10 | 66 | 78 | 90 | 70 | 82 | 94 | 74 | 86 | 68 | 80 | 92 | 72 | 84 | 96 | 76 | 88 | 71 | 83 | 95 | 75 | 87 | 67 | 79 | 91 | 69 | 81 | 93 | 77 | 89 | 73 | 85 |
| 11 | 97 | 109 | 121 | 101 | 113 | 125 | 105 | 117 | 99 | 111 | 123 | 103 | 115 | 127 | 107 | 119 | 102 | 114 | 127 | 106 | 118 | 98 | 110 | 122 | 100 | 112 | 124 | 108 | 120 | 104 | 116 |
| 12 | 128 | 141 | 153 | 133 | 145 | 157 | 137 | 149 | 131 | 143 | 155 | 135 | 147 | 159 | 139 | 151 | 134 | 146 | 158 | 138 | 150 | 130 | 142 | 154 | 132 | 144 | 156 | 140 | 152 | 136 | 148 |
| 13 | 160 | 172 | 184 | 164 | 176 | 188 | 168 | 180 | 162 | 174 | 186 | 166 | 178 | 190 | 170 | 182 | 165 | 177 | 189 | 169 | 181 | 161 | 173 | 185 | 163 | 175 | 187 | 171 | 183 | 167 | 179 |
| 14 | 191 | 203 | 215 | 195 | 207 | 219 | 199 | 211 | 193 | 205 | 217 | 197 | 209 | 221 | 201 | 213 | 196 | 208 | 220 | 200 | 212 | 192 | 204 | 216 | 194 | 206 | 218 | 202 | 214 | 198 | 210 |
| 15 | 222 | 234 | 246 | 226 | 238 | 250 | 230 | 242 | 224 | 236 | 248 | 228 | 240 | 252 | 232 | 244 | 227 | 239 | 251 | 231 | 243 | 223 | 235 | 247 | 225 | 237 | 249 | 233 | 245 | 229 | 241 |

FIG. 9B

| Subset Idx \ Pilot Idx | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | -235 | -222 | -209 | -196 | -183 | -170 | -157 | -144 | -131 | -115 | -102 | -89 | -76 | -63 | -50 | -37 | -24 | -11 | 243 | 230 | 217 | 204 | 191 | 178 | 165 | 152 | 139 | 123 | 110 | -97 | ⋮ |
| 1 | -205 | -192 | -179 | -166 | -153 | -140 | -124 | -111 | -98 | -85 | -72 | -59 | -46 | -33 | -20 | -7 | 239 | 226 | 213 | 200 | 187 | 174 | 161 | 148 | 135 | 119 | 106 | -93 | -80 | -67 | ⋮ |
| 2 | -175 | -162 | -149 | -136 | -120 | -107 | -94 | -81 | -68 | -55 | -42 | -29 | -16 | 248 | 235 | 222 | 209 | 196 | 183 | 170 | 157 | 144 | 131 | 115 | 102 | -89 | -76 | -63 | -50 | -37 | ⋮ |
| 3 | -145 | -132 | -116 | -103 | -90 | -77 | -64 | -51 | -38 | -25 | -12 | 244 | 231 | 218 | 205 | 192 | 179 | 166 | 153 | 140 | 124 | 111 | -98 | -85 | -72 | -59 | -46 | -33 | -20 | -7 | ⋮ |
| 4 | -111 | -98 | -85 | -72 | -59 | -46 | -33 | -20 | -7 | 239 | 226 | 213 | 200 | 187 | 174 | 161 | 148 | 135 | 119 | 106 | -93 | -80 | -67 | -54 | -41 | -28 | -15 | 247 | 234 | 221 | ⋮ |
| 5 | -81 | -68 | -55 | -42 | -29 | -16 | 248 | 235 | 222 | 209 | 196 | 183 | 170 | 157 | 144 | 131 | 115 | 102 | -89 | -76 | -63 | -50 | -37 | -24 | -11 | 243 | 230 | 217 | 204 | 191 | ⋮ |
| 6 | -51 | -38 | -25 | -12 | 244 | 231 | 218 | 205 | 192 | 179 | 166 | 153 | 140 | 124 | 111 | -98 | -85 | -72 | -59 | -46 | -33 | -20 | -7 | 239 | 226 | 213 | 200 | 187 | 174 | 161 | ⋮ |
| 7 | -21 | -8 | 240 | 227 | 214 | 201 | 188 | 175 | 162 | 149 | 136 | 120 | 107 | -94 | -81 | -68 | -55 | -42 | -29 | -16 | 248 | 235 | 222 | 209 | 196 | 183 | 170 | 157 | 144 | 131 | ⋮ |
| 8 | 21 | 34 | 47 | 60 | 73 | 86 | 99 | 112 | 125 | 141 | 154 | 167 | 180 | 193 | 206 | 219 | 232 | 245 | 13 | 26 | 39 | 52 | 65 | 78 | 91 | 104 | 117 | 133 | 146 | 159 | ⋮ |
| 9 | 51 | 64 | 77 | 90 | 103 | 116 | 132 | 145 | 158 | 171 | 184 | 197 | 210 | 223 | 236 | 249 | 17 | 30 | 43 | 56 | 69 | 82 | 95 | 108 | 121 | 137 | 150 | 163 | 176 | 189 | ⋮ |
| 10 | 81 | 94 | 107 | 120 | 136 | 149 | 162 | 175 | 188 | 201 | 214 | 227 | 240 | 8 | 21 | 34 | 47 | 60 | 73 | 86 | 99 | 112 | 125 | 141 | 154 | 167 | 180 | 193 | 206 | 219 | ⋮ |
| 11 | 111 | 124 | 140 | 153 | 166 | 179 | 192 | 205 | 218 | 231 | 244 | 12 | 25 | 38 | 51 | 64 | 77 | 90 | 103 | 116 | 132 | 145 | 158 | 171 | 184 | 197 | 210 | 223 | 236 | 249 | ⋮ |
| 12 | 145 | 158 | 171 | 184 | 197 | 210 | 223 | 236 | 249 | 17 | 30 | 43 | 56 | 69 | 82 | 95 | 108 | 121 | 137 | 150 | 163 | 176 | 189 | 202 | 215 | 228 | 241 | 9 | 22 | 35 | ⋮ |
| 13 | 175 | 188 | 201 | 214 | 227 | 240 | 8 | 21 | 34 | 47 | 60 | 73 | 86 | 99 | 112 | 125 | 141 | 154 | 167 | 180 | 193 | 206 | 219 | 232 | 245 | 13 | 26 | 39 | 52 | 65 | ⋮ |
| 14 | 205 | 218 | 231 | 244 | 12 | 25 | 38 | 51 | 64 | 77 | 90 | 103 | 116 | 132 | 145 | 158 | 171 | 184 | 197 | 210 | 223 | 236 | 249 | 17 | 30 | 43 | 56 | 69 | 82 | 95 | ⋮ |
| 15 | 235 | 248 | 16 | 29 | 42 | 55 | 68 | 81 | 94 | 107 | 120 | 136 | 149 | 162 | 175 | 188 | 201 | 214 | 227 | 240 | 8 | 21 | 34 | 47 | 60 | 73 | 86 | 99 | 112 | 125 | ⋮ |

FIG. 9C

SYSTEMS AND METHODS FOR TRANSMITTING PILOT TONES

The present application claims priority to provisional U.S. Application Ser. No. 61/620,865, entitled "SYSTEMS AND METHODS FOR TRANSMITTING PILOT TONES," filed Apr. 5, 2012, assigned to the assignee hereof and incorporated herein by reference in its entirety. The present application further claims priority to provisional U.S. Application Ser. No. 61/669,496, entitled "SYSTEMS AND METHODS FOR TRANSMITTING PILOT TONES," filed Jul. 9, 2012, assigned to the assignee hereof and incorporated herein by reference in its entirety. The present application further claims priority to provisional U.S. Application Ser. No. 61/699,777, entitled "SYSTEMS AND METHODS FOR TRANSMITTING PILOT TONES," filed Sep. 11, 2012, assigned to the assignee hereof and incorporated herein by reference in its entirety. The present application further claims priority to provisional U.S. Application Ser. No. 61/719,316, entitled "SYSTEMS AND METHODS FOR TRANSMITTING PILOT TONES," filed Oct. 26, 2012, assigned to the assignee hereof and incorporated herein by reference in its entirety.

BACKGROUND

Field

The present application relates generally to wireless communications, and more specifically to systems, methods, and devices for transmitting pilot tones. Certain aspects herein relate to shifting the tones over which pilots are transmitted from symbol to symbol for better channel estimation.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include channel estimation that accounts for Doppler.

One aspect of the disclosure provides a wireless communications apparatus comprising a processor configured to divide a plurality of tones on which pilot signals are to be transmitted among a plurality of symbols, wherein each symbol includes less than all of the plurality of tones and the plurality of symbols includes at least a subset of the plurality of tones; and a transmitter configured to transmit, during a given symbol, pilot signals on the tones included in the given symbol, wherein the tones over which the pilot signals are transmitted are changed from symbol to symbol.

Another aspect of the disclosure provides a method of communicating in a wireless network. The method comprises dividing a plurality of tones on which pilot signals are to be transmitted among a plurality of symbols, wherein each symbol includes less than all of the plurality of tones and the plurality of symbols includes at least a subset of the plurality of tones; and transmitting, during a given symbol, pilot signals on the tones included in the given symbol, wherein the tones over which the pilot signals are transmitted are changed from symbol to symbol.

Yet another aspect of the disclosure provides a wireless communications apparatus comprising means for dividing a plurality of tones on which pilot signals are to be transmitted among a plurality of symbols, wherein each symbol includes less than all of the plurality of tones and the plurality of symbols includes at least a subset of the plurality of tones; and means for transmitting, during a given symbol, pilot signals on the tones included in the given symbol, wherein the tones over which the pilot signals are transmitted are changed from symbol to symbol.

Another aspect of the disclosure provides a computer program product comprising a computer-readable medium. The computer-readable medium comprises code for dividing a plurality of tones on which pilot signals are to be transmitted among a plurality of symbols, wherein each symbol includes less than all of the plurality of tones and the plurality of symbols includes at least a subset of the plurality of tones; and code for transmitting, during a given symbol, pilot signals on the tones included in the given symbol, wherein the tones over which the pilot signals are transmitted are changed from symbol to symbol.

BRIEF DESCRIPTION OF THE DRAWINGS

FIG. 3 shows a functional block diagram of exemplary components that may be utilized in the wireless device of FIG. 2 to transmit wireless communications.

FIG. 4 shows a functional block diagram of exemplary components that may be utilized in the wireless device of FIG. 2 to receive wireless communications.

FIG. 5 is a table illustrating an example of assigning pilot signals to tones in a 1 MHz bandwidth OFDM communications network.

FIG. 5A is a table illustrating another example of assigning pilot signals to tones in a 1 MHz bandwidth OFDM communications network.

FIG. 5B is a table illustrating another example of assigning pilot signals to tones in a 1 MHz bandwidth OFDM communications network.

FIG. 5C is a table illustrating another example of assigning pilot signals to tones in a 1 MHz bandwidth OFDM communications network.

FIG. 5D is a table illustrating another example of assigning pilot signals to tones in a 1 MHz bandwidth OFDM communications network.

FIG. 5E is a table illustrating another example of assigning pilot signals to tones in a 1 MHz bandwidth OFDM communications network.

FIG. 5F is a table illustrating another example of assigning pilot signals to tones in a 1 MHz bandwidth OFDM communications network.

FIG. 6 is a table illustrating an example of assigning pilot signals to tones in a 2 MHz bandwidth OFDM communications network.

FIG. 6A is a table illustrating another example of assigning pilot signals to tones in a 2 MHz bandwidth OFDM communications network.

FIG. 6B is a table illustrating another example of assigning pilot signals to tones in a 2 MHz bandwidth OFDM communications network.

FIG. 6C is a table illustrating another example of assigning pilot signals to tones in a 2 MHz bandwidth OFDM communications network.

FIG. 6D is a table illustrating another example of assigning pilot signals to tones in a 2 MHz bandwidth OFDM communications network.

FIG. 6E is a table illustrating another example of assigning pilot signals to tones in a 2 MHz bandwidth OFDM communications network.

FIG. 6F is a table illustrating another example of assigning pilot signals to tones in a 2 MHz bandwidth OFDM communications network.

FIG. 7 is a table illustrating an example of assigning pilot signals to tones in a 4 MHz bandwidth OFDM communications network.

FIG. 7A is a table illustrating another example of assigning pilot signals to tones in a 4 MHz bandwidth OFDM communications network.

FIG. 7B is a table illustrating another example of assigning pilot signals to tones in a 4 MHz bandwidth OFDM communications network.

FIG. 7C is a table illustrating another example of assigning pilot signals to tones in a 4 MHz bandwidth OFDM communications network.

FIG. 7D is a table illustrating another example of assigning pilot signals to tones in a 4 MHz bandwidth OFDM communications network.

FIG. 7E is a table illustrating another example of assigning pilot signals to tones in a 4 MHz bandwidth OFDM communications network.

FIG. 8 is a table illustrating an example of assigning pilot signals to tones in a 8 MHz bandwidth OFDM communications network.

FIG. 8A is a table illustrating another example of assigning pilot signals to tones in a 8 MHz bandwidth OFDM communications network.

FIG. 8B is a table illustrating another example of assigning pilot signals to tones in a 8 MHz bandwidth OFDM communications network.

FIG. 8C is a table illustrating another example of assigning pilot signals to tones in a 8 MHz bandwidth OFDM communications network.

FIG. 8D is a table illustrating another example of assigning pilot signals to tones in a 8 MHz bandwidth OFDM communications network.

FIG. 8E is a table illustrating another example of assigning pilot signals to tones in a 8 MHz bandwidth OFDM communications network.

FIG. 8F is a table illustrating another example of assigning pilot signals to tones in a 8 MHz bandwidth OFDM communications network.

FIG. 8G is a table illustrating another example of assigning pilot signals to tones in a 8 MHz bandwidth OFDM communications network.

FIG. 8H is a table illustrating another example of assigning pilot signals to tones in a 8 MHz bandwidth OFDM communications network.

FIG. 8I is a table illustrating another example of assigning pilot signals to tones in a 8 MHz bandwidth OFDM communications network.

FIG. 8J is a table illustrating another example of assigning pilot signals to tones in a 8 MHz bandwidth OFDM communications network.

FIG. 9 is a table illustrating an example of assigning pilot signals to tones in a 16 MHz bandwidth OFDM communications network.

FIG. 9A is a table illustrating another example of assigning pilot signals to tones in a 16 MHz bandwidth OFDM communications network.

FIG. 9B is a table illustrating another example of assigning pilot signals to tones in a 16 MHz bandwidth OFDM communications network.

FIG. 9C is a table illustrating another example of assigning pilot signals to tones in a 16 MHz bandwidth OFDM communications network.

DETAILED DESCRIPTION

Figure 1:
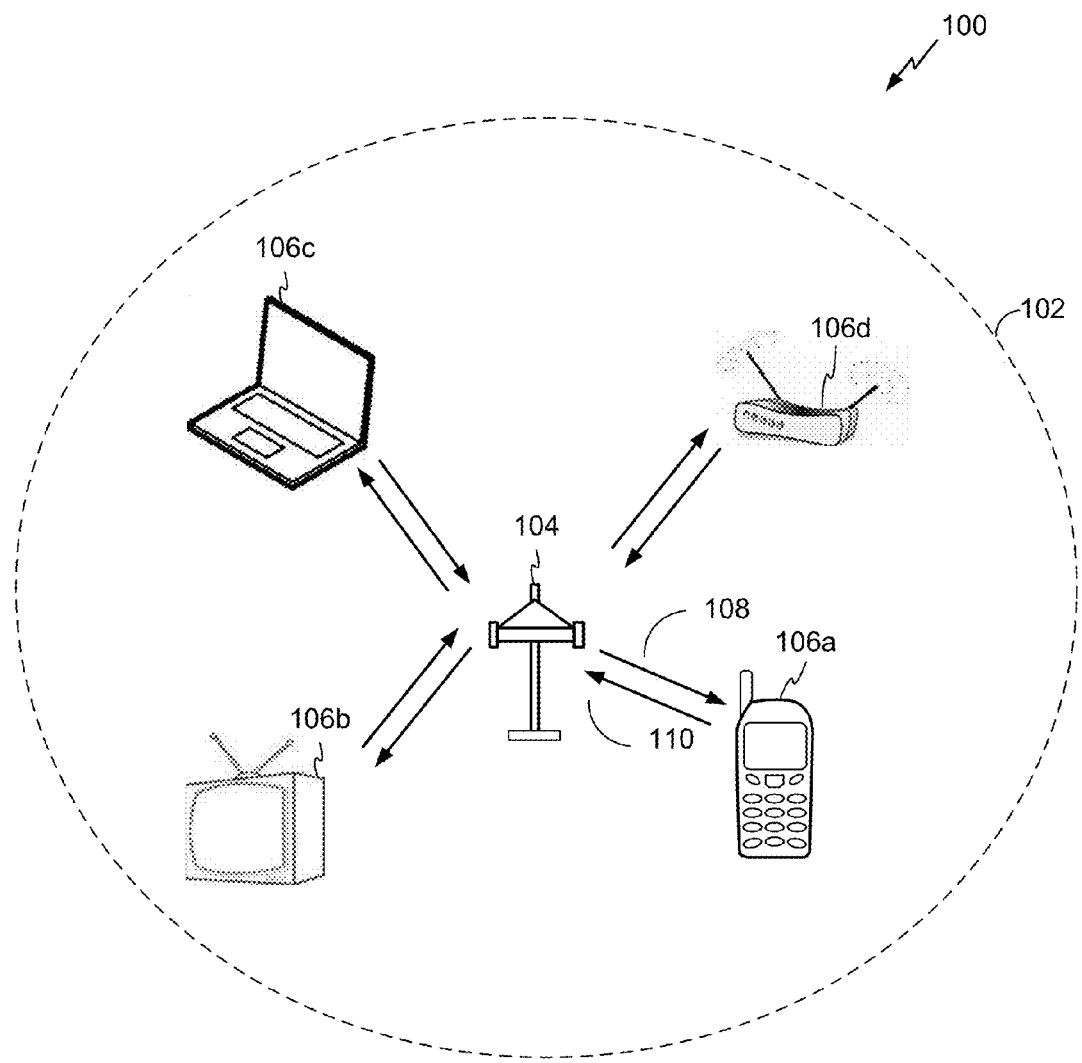
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct—sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
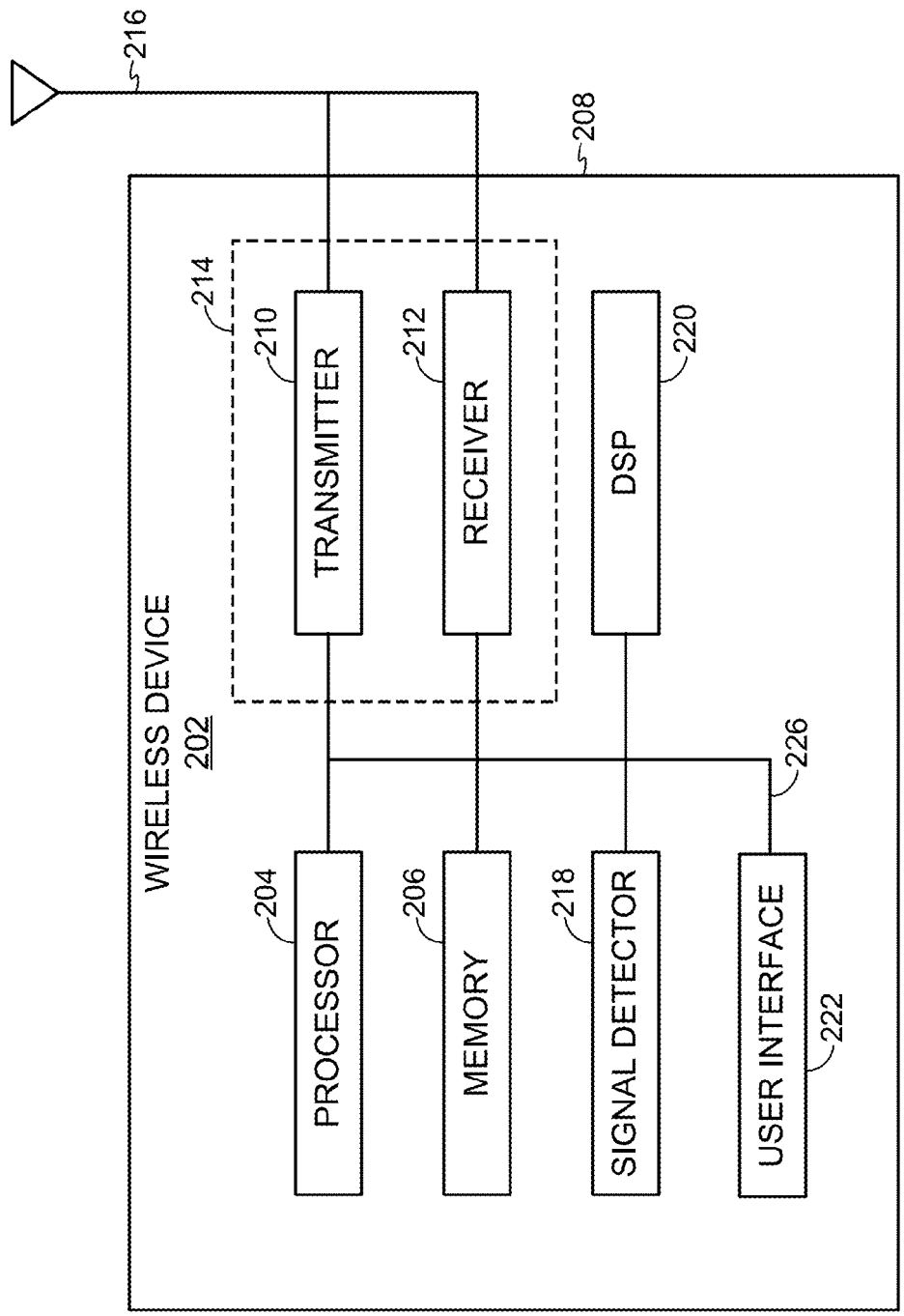
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit travelling pilot tones, as will be discussed in additional detail below. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate pilot tones for transmission.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets or data units, such as pilot tones, in a wireless signal based on the analog signal. The data units may be generated using the processor 204 and/or the DSP 220, for example using the modulator 302 and the transform module 304 as discussed above.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive pilot tones, as will be discussed in additional detail below. For example, the components illustrated in FIG. 4 may be used to receive pilot tones transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets or data units, such as pilot tones, in a wireless signal.

In the aspect illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received pilot tones. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The wireless device 202b may further comprise a channel estimator and equalizer 405 configured to form an estimate of the channel over which the pilot tone is received, and to remove certain effects of the channel based on the channel estimate. For example, the channel estimator 405 may be configured to approximate Doppler effects in the channel over which the pilot tone is received and account for such effects. For example, AGC and/or phase shifting may be performed based on the received pilot tones as would be understood by one of skill in the art.

In some aspects, the channel estimator and equalizer 405 uses information in one or more received pilot tones. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more pilot tones. Using the functions or components described above, the data pilot tones therein may be decoded evaluated or otherwise evaluated or processed.

In OFDM, information is communicated using a number of orthogonal subcarriers of the frequency band being used. The number of subcarriers that are used may depend on a variety of considerations including the available frequency bands for use, bandwidth and any associated regulatory constraints. The number of subcarriers used is correlated to the size of an FFT module as each modulated subcarrier is an input to an IFFT module to create the OFDM signal to be transmitted. As such, in some implementations a larger FFT size (e.g., 64, 128, 256, 512) may, corresponding to transmitting data using more subcarriers, be desired to achieve a larger bandwidth. In other implementations, a smaller FFT size may be used for transmitting data in a narrow bandwidth. The number of subcarriers, and therefore FFT size, may be chosen so as to comply with regulatory domains with certain bandwidth restrictions. For example, an FFT size of 32 may be provided for certain implementations (e.g., for down clocked implementations), and provided for use for 802.11ah. As such, the wireless device 202a may include a several transform modules 304 implemented as an FFT or IFFT module, each of different sizes so as to comply with the number of subcarriers specified to be used.

As part of communication using OFDM, a wireless device 202a may transmit to a wireless device 202b one or more pilot signals. The wireless device 202b receiving these pilot signals may utilize the pilot signals for measurement of channel conditions (e.g., equalizer gain and phase shift for each sub-carrier). These pilot signals may also be used for frequency synchronization, such as to avoid inter-carrier interference caused by Doppler shift. The pilot signals may be transmitted in one or more sub-carriers (also referred to as "tones") of the available frequency band for communication. Transmissions in OFDM may be divided in time and frequency. For example, as stated, the frequency bandwidth over which information is transmitted may be divided into a number of tones, which may be equally spaced. Further, transmission may be divided over time, each time period being referred to as a "symbol." The terms "tone" and "symbol" are used as would be understood by one of skill in the art in OFDM communication.

In certain aspects discussed herein, in order to combat time variation in long packets due to Doppler shift, travelling pilots are used for channel estimation. The number of pilots transmitted in a symbol may be based on the frequency bandwidth of the OFDM communications. For example, 2, 4, 6, 8, and 16 pilot signals per symbol may be used for frequency bandwidths of 1, 2, 4, 8, and 16 MHz, respectively. Each pilot signal may be transmitted over one tone per symbol. The tone over which a pilot signal is transmitted may be changed from symbol to symbol to ensure that a pilot signal is received for each tone, allowing channel estimation over each tone. In some embodiments, pilot signals may be transmitted and received for all tones. This may require additional symbols to be used for pilot signal transmission, as each symbol is only used to transmit a pilot signal over a portion of the tones. This may lead to higher Doppler error in estimating the channel for each tone as the channel conditions may change more over time. In some embodiments, pilot signals may be transmitted and received for less than all tones (e.g., sent over fewer symbols). Channel estimation for tones for which no pilot signals are received may be interpolated through interpolation as is known in the art. However, the less pilot signals used for the interpolation, the greater the interpolation error. Accordingly, it should be understood that the number of tones/symbols over which pilot signals are used for channel estimation may be changed and may based on a determination of balancing Doppler error and interpolation error. Therefore, a transmitter may transmit pilot signals over some or all tones, and a receiver may utilize all the pilot signals transmitted or only some of the pilot signals transmitted depending on design considerations.

The tones over which pilot signals are to be transmitted may be divided into subsets according to the number of tones (T) used for communication and the number of pilot signals transmitted per symbol (P). Accordingly, there may be T/P subsets. For example, where there are 26 tones used for communication, and 2 pilot signals used per tone, there may be 13 subsets. Pilot signals may be transmitted over the tones of a subset in a symbol. Accordingly, to transmit pilot signals over all of the tones, T/P symbols would need to be used for transmission, where each symbol includes pilot signals on the tones of one of the subsets.

The tones selected to be part of a subset may be based on certain criteria. For example, the tones in a subset may be selected to have large distance between the frequencies of the tones of a given subset (also referred to as large intra-symbol distance between tones). Further, the tones of a subset may be selected to have a large distance between the frequencies of the tones of subsets transmitted in symbols close in time (e.g., sequential or adjacent symbols) (also referred to as large inter-symbol distance between tones). Separation of tones in frequency helps reduce the chance of the tones suffering from the same amount of channel fade, and therefore improves channel estimation.

FIG. 5 is a table illustrating an example of assigning pilot signals to tones in a 1 MHz bandwidth OFDM communications network. As shown, each column indicates a symbol used for transmission of pilot signals. Further, each row indicates a tone used for transmission of a pilot signal in the given symbol. The 1 MHz bandwidth system includes 26 tones. Further, 2 tones are used for transmission of pilot signals per symbol. Accordingly 26/2=13 symbols are needed to transmit a pilot signal over each of the 26 tones. The symbols are labeled with index values 0-12. The symbols may be transmitted sequentially from index 0-12. Further, transmission of the symbols may be done in a round robin fashion, meaning that when symbol index 12 is reached, transmission of the pilot signals restarts at symbol index 0 and proceeds sequentially again. The pilot signals are also indexed, with 2 indices per symbol (0 and 1). It should be noted that the order of the pilot indexes for a given symbol is not important as the value of each table element is a tone over which a pilot signal is to be transmitted for the given symbol.

FIG. 5 is just one example of how tones may be selected for transmission of travelling pilot signals over symbols. It should be noted, however, that other configurations may also be used. For example, FIG. 5 illustrates selecting tones for a given symbol so that the tones are symmetric about a direct current (DC) component. However, the tones may not be selected to be symmetric. Some criteria that may be used for selecting tones for a symbol may be the following: large intra- and/or inter-symbol distances between tone indices as discussed above and selection of tones such that there is no more than X tone separation between tones adjacent and/or sequential symbols. For example, tones with a frequency span on the order of a coherence bandwidth or less experience correlated fading, therefore, it may be preferable to maximize intra-symbol distance of pilot tones. Tones with a time span on the order of the coherence time or less also experience correlated Doppler fading, therefore, it may be preferable to maximize inter-symbol distance of pilot tones. X may be chosen to be a value such as 3 or 4, such that a balance is struck between fade and coherence bandwidth. As shown in FIG. 5, the separation between tones of different symbols is 3 tones (e.g., between symbol 0 and symbol 1, −1 is separated from −4 by 3 tones and 1 is separated from 4 by 3 tones).

Further, the symbols of the table of FIG. 5 may be divided into different groups 502a, 502b, and 502c. As shown, each group includes a plurality of adjacent and/or sequential symbols. The symbols may be allocated to groups to have equal or approximately equal number of symbols per group. The tone selected for transmitting pilot signals in symbols of the group may be selected such that there is an even or approximately even distribution of frequency tones in each group. The wireless device 202b receiving the symbols of a group may then utilize the pilot signals transmitted on tones of the groups to perform channel estimation, and further interpolate channel information for those tones that are not part of the group. An even or approximately even distribution of frequency tones may lead to better interpolation as would be understood by one of skill in the art. Accordingly, even distribution of tones between groups may be another criteria for how tones are selected for transmission of pilot signals in particular symbols.

FIG. 6 is a table illustrating an example of assigning pilot signals to tones in a 2 MHz bandwidth OFDM communications network. As shown, each column indicates a symbol used for transmission of pilot signals. Further, each row indicates a tone used for transmission of a pilot signal in the given symbol. The 2 MHz bandwidth system includes 56 tones. Further, 4 tones are used for transmission of pilot signals per symbol. Accordingly 56/4=14 symbols are needed to transmit a pilot signal over each of the 56 tones. The symbols are labeled with index values 0-13. The symbols may be transmitted sequentially from index 0-13. Further, transmission of the symbols may be done in a round robin fashion, meaning that when symbol index 13 is reached, transmission of the pilot signals restarts at symbol index 0 and proceeds sequentially again. The pilot signals are also indexed, with 4 indices per symbol (0, 1, 2, 3). It should be noted that the order of the pilot indexes for a given symbol is not important as the value of each table element is a tone over which a pilot signal is to be transmitted for the given symbol. Similar to FIG. 5, the symbols of the table of FIG. 6 may be divided into different groups 602a, 602b, and 602c.

In some aspects, one or more additional symbols may be added to the sequence of symbols that is greater than the number of symbols needed to send pilot signal transmissions over each of the tones. For example, as shown in FIG. 6, symbol index 0 is repeated after symbol index 13. It should be noted that a different symbol may be repeated, or a different symbol generated with pilot signals on different tones than symbol indices already used consistent with the teachings herein. An additional symbol may be added for example, when there is an odd number of symbols so as to make the number of transmission symbols even (see example of FIG. 7). In other aspects, an additional symbol may be added to ensure that each group has the same number of symbols. Accordingly, as shown in FIG. 6, group 602c has an added symbol index 0 so as to ensure each of groups 602a, 602b, and 602c comprises the same number (e.g., 5) of symbols. In another aspect, an additional symbol may be added to ensure that there is no more than X tone separation between tones adjacent and/or sequential symbols of a given group as discussed above with respect to FIG. 5 and further discussed below with respect to FIG. 7.

Similar to the table of FIG. 5, FIG. 6 is just one example of how tones may be selected for transmission of travelling pilot signals over symbols. It should be noted, however, that other configurations may also be used. For example, tones may be selected for transmission of travelling pilot signals over symbols according to the same or similar criteria as discussed above with respect to FIG. 5.

FIG. 7 is a table illustrating an example of assigning pilot signals to tones in a 4 MHz bandwidth OFDM communications network. As shown, each column indicates a symbol used for transmission of pilot signals. Further, each row indicates a tone used for transmission of a pilot signal in the given symbol. The 4 MHz bandwidth system includes 114 tones. Further, 6 tones are used for transmission of pilot signals per symbol. Accordingly 114/6=19 symbols are needed to transmit a pilot signal over each of the 114 tones. The symbols are labeled with index values 0-18. The symbols may be transmitted sequentially from index 0-18. Further, transmission of the symbols may be done in a round robin fashion, meaning that when symbol index 18 is reached, transmission of the pilot signals restarts at symbol index 0 and proceeds sequentially again. The pilot signals are also indexed, with 6 indices per symbol (0, 1, 2, 3, 4, 5). It should be noted that the order of the pilot indexes for a given symbol is not important as the value of each table element is a tone over which a pilot signal is to be transmitted for the given symbol. Similar to FIG. 5, the symbols of the table of FIG. 7 may be divided into different groups 702a, 702b, 702c, and 702d.

In some aspects, one or more additional symbols may be added to the sequence of symbols that is greater than the number of symbols needed to send pilot signal transmissions over each of the tones as discussed above. For example, as shown in FIG. 7, symbol index 0 is repeated after symbol index 18. It should be noted that a different symbol may be repeated, or a different symbol generated with pilot signals on different tones than symbol indices already used consistent with the teachings herein. An additional symbol may be added for example, when there is an odd number of symbols so as to make the number of transmission symbols even. In other aspects, an additional symbol may be added to ensure that each group has the same number of symbols. Accordingly, as shown in FIG. 7, group 702d has an added symbol index 0 so as to ensure each of groups 702a, 702b, 702c, and 702d comprises the same number (e.g., 5) of symbols. In another aspect, an additional symbol may be added to ensure that there is no more than X tone separation between tones adjacent and/or sequential symbols of a given group so as to help with coherence bandwidth for channel estimation as discussed above. For example, between symbol indices 15 and 18 of group 702d, there is a separation of 7 tones between the closest two tone values (value 17 in symbol 18 pilot 3, and value 24 in symbol 15 pilot 4). This may be greater than the appropriate separation. By adding symbol 0, the separation between symbol 18 and symbol 0 is 4 (value 17 in symbol 18 pilot 3, and value 21 in symbol 0 pilot 4). Further, the separation between symbol 0 and symbol 15 is 3 (value 21 in symbol 0 pilot 4, and value 24 in symbol 15 pilot 4).

Similar to the table of FIG. 5, FIG. 7 is just one example of how tones may be selected for transmission of travelling pilot signals over symbols. It should be noted, however, that other configurations may also be used. For example, tones may be selected for transmission of travelling pilot signals over symbols according to the same or similar criteria as discussed above with respect to FIG. 7.

FIG. 8 is a table illustrating an example of assigning pilot signals to tones in a 8 MHz bandwidth OFDM communications network. As shown, each column indicates a symbol used for transmission of pilot signals. Further, each row indicates a tone used for transmission of a pilot signal in the given symbol. The 8 MHz bandwidth system includes 242 tones. Further, 8 tones are used for transmission of pilot signals per symbol. Accordingly 114/6 is about 31 symbols needed to transmit a pilot signal over each of the 242 tones. The symbols are labeled with index values 0-30. The symbols may be transmitted sequentially from index 0-30. Further, transmission of the symbols may be done in a round robin fashion, meaning that when symbol index 30 is reached, transmission of the pilot signals restarts at symbol index 0 and proceeds sequentially again. The pilot signals are also indexed, with 6 indices per symbol (0, 1, 2, 3, 4, 5, 6, 7). It should be noted that the order of the pilot indexes for a given symbol is not important as the value of each table element is a tone over which a pilot signal is to be transmitted for the given symbol. Similar to FIG. 5, the symbols of the table of FIG. 8 may be divided into different groups 802a, 802b, 802c, and 802d. The use of 31 symbols may allow for 248 tones to be used for transmission of pilot signals. However, there may only be 242 tones used for transmission in the OFDM system. Accordingly, some tones may be repeated. For example, as shown, each of tones –2, 2, –122, and 122 are repeated multiple times to fill the entire table of FIG. 8. The selection of which tones to repeat may be varied for different circumstances.

In some aspects, one or more additional symbols may be added to the sequence of symbols that is greater than the number of symbols needed to send pilot signal transmissions over each of the tones as discussed above. Similar to the table of FIG. 5, FIG. 8 is just one example of how tones may be selected for transmission of travelling pilot signals over symbols. It should be noted, however, that other configurations may also be used. For example, tones may be selected for transmission of travelling pilot signals over symbols according to the same or similar criteria as discussed above with respect to FIG. 8.

FIG. 8A is a table illustrating another example of assigning pilot signals to tones in a 8 MHz bandwidth OFDM communications network. As shown, the tones for each symbol are selected according to the following equation:

$$SC_{\{0,\ldots,7\}}^{(0)}=\{-104,-73,-42,-11,11,42,73,104\},$$
$$SC_i^{(n+1)}=\text{sign}(SC_i^{(0)})*(\text{mod}\{\text{sign}(SC_i^{(0)})*(SC_i^{(n)}+\delta)-s,\ pM/2\}+s)$$

where i is the pilot index, n is the subset index, $\delta$ is the offset, s is the smallest positive pilot, where p=8 is the number of pilots per OFDM symbol, N=242 is the total number of pilot tones, and where number of subsets (periodicity) M=ceil(N/p)=31.

In some aspects tones may need to be repeated to fill the table as discussed above. In one aspect, one way to repeat tones is pick s=1 instead of 2, then use function f(·) to map invalid tones to nearest valid tones, i.e., final process SCi (n)←f{SCi(n)}:{0,±1}→±2, {±123, ±124, etc.}→±122.

If $\delta$ and M are mutually prime, all pilot tones can be visited in one period. In some aspects, a value for $\delta$ is chosen so $\delta \le \text{floor}(M/2)=15$ since a different value yields an equivalent but reversed sequence. In some aspects, $SC_{i-p/2-1}^{(n)} = SC_i^{(M-n)}$. In some aspects, $\delta$ should be selected to achieve large inter-symbol distance. In the table of FIG. 8A, $\delta$=13.

FIG. 9 is a table illustrating an example of assigning pilot signals to tones in a 16 MHz bandwidth OFDM communications network. As shown, each column indicates a symbol used for transmission of pilot signals. Further, each row indicates a tone used for transmission of a pilot signal in the given symbol. The 16 MHz bandwidth system includes 484 tones. Further, 16 tones are used for transmission of pilot signals per symbol. Accordingly 484/16 is about 31 symbols needed to transmit a pilot signal over each of the 484 tones. The symbols are labeled with index values 0-30. The symbols may be transmitted sequentially from index 0-30. Further, transmission of the symbols may be done in a round robin fashion, meaning that when symbol index 30 is reached, transmission of the pilot signals restarts at symbol index 0 and proceeds sequentially again. The pilot signals are also indexed, with 6 indices per symbol (0, 1, 2, 3, 4, 5, 6, 7, 8, 9, 10, 11, 12, 13, 14, 15). It should be noted that the order of the pilot indexes for a given symbol is not important as the value of each table element is a tone over which a pilot signal is to be transmitted for the given symbol. Similar to FIG. 5, the symbols of the table of FIG. 9 may be divided into different groups 902a, 902b, 902c, and 902d. The use of 31 symbols may allow for 496 tones to be used for transmission of pilot signals. However, there may only be 484 tones used for transmission in the OFDM system. Accordingly, some tones may be repeated. For example, as shown, each of tones 250, –250, 130, –130, 126, –126, 6, and –6 are repeated multiple times to fill the entire table of FIG. 9. The selection of which tones to repeat may be varied for different circumstances.

In some aspects, one or more additional symbols may be added to the sequence of symbols that is greater than the number of symbols needed to send pilot signal transmissions over each of the tones as discussed above. Similar to the table of FIG. 5, FIG. 9 is just one example of how tones may be selected for transmission of travelling pilot signals over symbols. It should be noted, however, that other configurations may also be used. For example, tones may be selected for transmission of travelling pilot signals over symbols according to the same or similar criteria as discussed above with respect to FIG. 9.

FIG. 9A is a table illustrating another example of assigning pilot signals to tones in a 16 MHz bandwidth OFDM communications network. As shown, the tones for each symbol are selected according to the following equation:

$SC_{\{0,\ldots,15\}}^{(0)}=\{-242,-211,-180,-149,-118,-87,-56,-25,25,56,87,118,149,180,211,242\},$
$SC_i^{(n+1)}=\text{sign}(SC_i^{(0)})*(\text{mod}\{\text{sign}(SC_i^{(0)})*(SC_i^{(n)}+\delta)-s, pM/2\}+s),$ where i is the pilot index, n is the subset index, δ is the offset, s is the smallest positive pilot, where p=16 is the number of pilots per OFDM symbol, N=484 is the total number of pilot tones, and where number of subsets (periodicity) M=ceil(N/p)=31.

In some aspects tones may need to be repeated to fill the table as discussed above. In one aspect, one way to repeat tones is pick s=4 instead of 6, then use function f(·) to map invalid tones to nearest valid tones. i.e., $\{0, \ldots, \pm 5\} \rightarrow \pm 6$, $\pm 127 \rightarrow \pm 126$, $\{\pm 128, \pm 129\} \rightarrow \pm 130$, $\{\pm 251, \pm 252,$ etc.$\} \rightarrow \pm 250$.

$N_{ST}$ is a multiple of $N_{SP}$ that is nearest to the number of subcarriers per symbol, $N_{SP}$ is the number of pilots per OFDM symbol (e.g., NST={26,56,114,242,484} or {26,56,114,240,484}, NSP={2,4,6,8,16} for BW={1,2,4,8,16}).

In some aspects, the tones for each symbol are selected according to the following functions:

$SC_i^{(n)}=\text{sign}(SC_i^{(0)})*(\text{mod}\{\text{sign}(SC_i^{(0)})*(SC_i^{(n-1)}+\delta)-s, N_{ST}/2\}+s).$ Table 2 is an example of an initial subset. The example of Table 2 has an even distribution of tones in time and frequency, i.e., maximum intra- and inter-subset distance. The example of Table 2 further has gaps in (positive) m-space (Δ) close to NST/NSP={13, 14, 19, 30.25, 30.25}. The example of Tables 2 further has periodicity of gaps (p) defined as that of cyclic repetition of Δ.

TABLE 2

| | BW | | | | |
|---|---|---|---|---|---|
| | 1 | 2 | 4 | 8 | 16 |
| $m_i^{(0)}$ | −7, 6 | −21, −7, 6, 20 | −48, −29, −10, 9, 28, 47 | −106, −76, −46, −16, 15, 45, 75, 105 | −227, −197, −167, −137, −106, −76, −46, −16, 15, 45, 75, 105, 136, 166, 196, 226 |
| $SC_i^{(0)} = M^s_{BW}{}^{-1}(m_i^{(0)})$ | −7, 7 | −21, −7, 7, 21 | −49, −30, −11, 11, 30, 49 | −107, −77, −47, −17, 17, 47, 77, 107 | −235, −205, −175, −145, −111, −81, −51, −21, 21, 51, 81, 111, 145, 175, 205, 235 |
| Δ (pos. m-space) | 13 | 14, (14) | 19, 19, (19) | 30, 30, 30, (31) | 30, 30, 30, 31, 30, 30, 30, (31) |
| p | 1 | 1 | 1 | 4 | 4 |

If δ and M are mutually prime, all pilot tones can be visited in one period. In some aspects, a value for δ is chosen so δ≤floor(M/2)=15 since a different value yields an equivalent but reversed sequence. In some aspects, $SC_{i-p/2-1}^{(n)}=SC_i^{(M-n)}$. In some aspects, δ should be selected to achieve large inter-symbol distance. In the table of FIG. 9A, δ=13.

In some aspects, the tones for each symbol are selected according to a bijection stitching function $M^s_{BW}(k)$. Such a function may allow gaps between valid tones to be squeezed out and then stitched into a whole piece. The inverse function $M^s_{BW}{}^{-1}(k)$ splits one whole piece back to several pieces. After stitching, $0 \leq M^s_{BW}(k) \leq N_{ST}-1$. In some aspects, the values of k for various bandwidths is shown below in Table 1.

In some aspects, to allow for pilots to travel across DC (zero crossing), thereby always having an equal number of pilots with positive and negative signs, the tones for each symbol are selected according to the following functions:

$m_i^{(n)}=\text{mod}\{m_i^{(0)}+N_{ST}/2+n\delta, N_{ST}\}-N_{ST}/2;$ $SC_i^{(n)}=M^s_{BW}{}^{-1}(m_i^{(n)}),$ where, i is the pilot index, n is the subset index, δ is the offset, and $N_{ST}$ is a multiple of $N_{SP}$ that is nearest to the number of subcarriers per symbol, $N_{SP}$ is the number of pilots per symbol, and $N_{SC}$ is the FFT size.

Alternatively, in some aspects, to allow for pilots to travel across DC (zero crossing), thereby always having an equal

TABLE 1

| | BW | | | | |
|---|---|---|---|---|---|
| | 1 | 2 | 4 | 8 | 16 |
| $M^s_{BW}(k)$ | k, −13 = k = −1<br>k − 1, 1 = k = 13 | k, −28 = −1<br>k − 1, 1 = k = 28 | k + 1, −58 = k = −2<br>k − 2, 2 = k = 58 | k + 1, −122 = k = −2<br>k − 2, 2 = k = 122 | k + 8, −250 = −130<br>k + 5, −126 = k = −6<br>k − 6, 6 = k = 126<br>k − 9, 130 = k = 250 |
| $M^s_{BW}{}^{-1}(m)$ | m, −13 = m = −1<br>m + 1, 0 = m = 12 | m, −28 = m = −1<br>m + 1, 0 = m = 27 | m − 1, −57 = m = −1<br>m + 2, 0 = m = 56 | m − 1, −121 = m = −1<br>m + 2, 0 = m = 120 | m − 8, −242 = m = −122<br>m − 5, −121 = m = −1<br>m + 6, 0 = m = 120<br>m + 9, 121 = m = 241 |

In some aspects, the tones for each symbol are selected according to the following functions:

$m_i^{(n)}=\text{mod}\{m_i^{(0)}+n\delta, N_{ST}/2\}-I(m_i^{(0)}<0)*N_{ST}/2;$ $SC_i^{(n)}=M^s_{BW}{}^{-1}(m_i^{(n)}),$ where, i is the pilot index, n is the subset index, δ is the offset, I(·) is indicator function; and number of pilots with positive and negative signs, the tones for each symbol are selected according to the following functions:

$t_i^{(n)}=\text{mod}\{SC_i^{(n-1)}+N_{SC}/2+\delta, N_{SC}\}-N_{SC}/2;$ $SC_i^{(n)}=t_i^{(n)}-I(-s<t_i^{(n)}<s)*\text{sign}(SC_i^{(n-1)}))*2s,$ where, i is the pilot index, n is the subset index, δ is the offset, and $N_{ST}$ is a multiple of $N_{SP}$ that is nearest to the number of subcarriers per symbol, $N_{SP}$ is the number of pilots per symbol, and $N_{SC}$ is the FFT size; and where this is a direct formula except in the 16 MHz case, where s is the index of the smallest positive pilot, and I(·) is the indicator function.

Table 3 is an example of an initial subset for a zero crossing scenario. The periodicity of the 2 MHz bandwidth case is increased from 14 to $pN_{ST}/N_{SP}=4*56/4=56$, in this example.

n−1 as shown by the following equation noted above: $SC_i^{(n)}=\text{sign}(SC_i^{(0)})*(\text{mod}\{\text{sign}(SC_i^{(0)})*(SC_i^{(n-1)}+\delta)-s, N_{ST}/2\}+2+s)$. In this equation, i is the pilot index taking values between 0 and $N_{SP}-1$, n is the subset index, δ is the offset, and s is the index of the smallest positive pilot. $N_{ST}$ is a multiple of $N_{SP}$ that is nearest to the number of subcarriers per symbol (e.g., $N_{ST}=\{26, 56, 114, 242, 484\}$ or $\{26, 56, 114, 240, 484\}$ for BW=$\{1, 2, 4, 8, 16\}$ MHz) and $N_{SP}$ is the number of pilots per symbol (e.g., $N_{SP}=\{2, 4, 6, 8, 16\}$ for BW=$\{1, 2, 4, 8, 16\}$ MHz). Table 4 below shows a further example of an initial subset with additional scheme options

TABLE 3

| | BW | | | | |
|---|---|---|---|---|---|
| | 1 | 2 | 4 | 8 | 16 |
| $m_i^{(0)}$ | −7, 6 | −21, −7, 6, 20 | −48, −29, −10, 9, 28, 47 | −106, −76, −46, −16, 15, 45, 75, 105 | −227, −197, −167, −137, −106, −76, −46, −16, 15, 45, 75, 105, 136, 166, 196, 226 |
| $SC_i^{(0)} = M^s_{BW}{}^{-1}(m_i^{(0)})$ | −7, 7 | −21, −7, 7, 21 | −49, −30, −11, 11, 30, 49 | −107, −77, −47, −17, 17, 47, 77, 107 | 235, −205, −175, −145, −111, −81, −51, −21, 21, 51, 81, 111, 145, 175, 205, 235 |
| Δ | 13, 13 | 14, 13, 14, (15) | 19, 19, 19, 19, 19, (19) | 30, 30, 30, 31, 30, 30, 30, (31) | 30, 30, 30, 31, 30, 30, 30, 31, 30, 30, 30, 31, 30, 30, (31) |
| p | 1 | 4 | 1 | 4 | 4 |

FIG. 5B is a table illustrating another example of assigning pilot signals to tones in a 1 MHz bandwidth OFDM communications network. As shown, the tones for each symbol are selected according to the above described stitching function and the following:

Subsets are visited in a round robin manner (e.g. Pilots in $1^{st}$ symbol visit tone indices of subset 0, pilots in $2^{nd}$ symbol visit tone indices of subset 1, and so on. After visiting tone indices of subset 3, the pilots go back to visit tone indices of subset 0);

Number of subsets (Periodicity) $P=pN_{ST}/N_{SP}=1*26/2=13$;

If δ and Δ=13 are mutually prime, all pilot tones can be visited in one period;

Consider only δ≤floor(Δ/2)=6 since otherwise yields equivalent but reversed sequence. Actually $SC_0^{(n)}=-SC_i^{(P-n)}$;

Choose δ for large inter-symbol distance;

i.e., avoid numbers near Δ/2, Δ/3, Δ/4, etc.; and

δ=5 is shown in the table of FIG. 5B.

As described above, the pilot indices for a symbol n may be expressed as a function of the location of pilots at symbol that may reuse pilots in SIG symbols to update all tones sooner.

TABLE 4

| | BW | | | | |
|---|---|---|---|---|---|
| | 1 | 2 | 4 | 8 | 16 |
| SCi(0) | −7, 7 | −21, −7, 7, 21 | −49, −30, −11, 11, 30, 49 | −107, −77, −47, −17, 17, 47, 77, 107 | −235, −205, −175, −145, −111, −81, −51, −21, 21, 51, 81, 111, 145, 175, 205, 235 |
| | −2, 12 | −16, −2, 12, 26 | | −109, −78, −47, −16, 16, 47, 78, 109 | −237, −206, −175, −144, −112, −81, −50, −19, 19, 50, 81, 112, 144, 175, 206, 237 |
| δ | 5 | 5 | 8 | 13 | 13 |

As described above, FIG. 5B shows one possible selection of the pilot indices for each symbol for a 1 MHz bandwidth OFDM communication. FIG. 5D shows another example of the pilot indices for each symbol for a 1 MHz bandwidth OFDM communication that may reuse pilots in SIG symbols to update all tones sooner. In other words, the first pattern as shown in FIG. 5B may be rolled over to last pattern shown in FIG. 5D because this pattern is already covered by the signal (SIG) field OFDM symbol that comes before.

FIG. 6B is a table illustrating another example of assigning pilot signals to tones in a 2 MHz bandwidth OFDM communications network. As shown, the tones for each symbol are selected according to the above described stitching function and the following:

Number of subsets (Periodicity) $P=pN_{ST}/N_{SP}=1*56/4=14$;

If δ and Δ=14 are mutually prime, all pilot tones can be visited in one period;

Consider only δ≤floor(Δ/2)=7 since otherwise yields equivalent but reversed sequence. Actually $\{SC_0^{(n)}, SC_1^{(n)}\}=-\{SC_2^{(P-n)}, SC_3^{(P-n)}\}$;

Choose δ for large inter-symbol distance;

i.e., avoid numbers near Δ/2, Δ/3, Δ/4, etc.; and

δ=5 is shown in the table of FIG. 6B.

FIG. 6D shows another example of pilots indices for each symbol for a 2 MHz bandwidth OFDM communication that may reuse pilots in SIG symbols to update all tones sooner. In other words, the first pattern as shown in FIG. 6B may be rolled over to last pattern shown in FIG. 6D because this pattern is already covered by the signal (SIG) field OFDM symbol that comes before.

FIG. 7B is a table illustrating another example of assigning pilot signals to tones in a 4 MHz bandwidth OFDM communications network. As shown, the tones for each symbol are selected according to the above described stitching function and the following:

Number of subsets (Periodicity) $P=pN_{ST}/N_{SP}=1*114/6=19$;

If $\delta$ and $\Delta=19$ are mutually prime, all pilot tones can be visited in one period;

Consider only $\delta \leq \text{floor}(\Delta/2)=9$ since otherwise yields equivalent but reversed sequence. Actually $\{SC_0^{(n)}, SC_1^{(n)}, SC_2^{(n)}\}=-\{SC_3^{(P-n)}, SC_4^{(P-n)}, SC_5^{(P-n)}\}$;

Choose $\delta$ for large inter-symbol distance;
  i.e., avoid numbers near $\Delta/2, \Delta/3, \Delta/4$, etc.;
  $\delta=8$ is shown in the table of FIG. 7B; and First subset $\{\pm 11, \pm 30, \pm 49\}$ is different from fixed pilots in 11ac $\{\pm 11, \pm 25, \pm 53\}$
  The latter is not evenly spaced.

FIG. 8C is a table illustrating another example of assigning pilot signals to tones in a 8 MHz bandwidth OFDM communications network. As shown, the tones for each symbol are selected according to the above described stitching function and the following:

Number of subsets (Periodicity) $P=pNST/NSP=4*242/8=121$;

If $\delta$ and $\Delta=30/31$ are mutually prime, all pilot tones can be visited in one period;

Consider only $\delta \leq \text{floor}(\Delta/2)=15$ since otherwise yields equivalent but reversed; sequence. Actually $\{SC0(n), SC1(n), SC2(n), SC3(n)\}=-\{SC4(P-n), SC5(P-n), SC6(P-n), SC7(P-n)\}$;

Choose $\delta$ for large inter-symbol distance;
  i.e., avoid numbers near $\Delta/2, \Delta/3, \Delta/4$, etc.;
  $\delta 6 =13$ is shown in the table of FIG. 8C (only show first 30 columns since periodicity P=121 is large; and First subset $\{\pm 17, \pm 47, \pm 77, \pm 107\}$ is different from fixed pilots in 11ac $\{\pm 11, \pm 39, \pm 75, \pm 103\}$
  The latter is not evenly spaced.

FIG. 9C is a table illustrating another example of assigning pilot signals to tones in a 16 MHz bandwidth OFDM communications network. As shown, the tones for each symbol are selected according to the above described stitching function and the following:

Number of subsets (Periodicity) $P=pN_{ST}/N_{SP}=4*484/16=121$;

If $\delta$ and $\Delta=30/31$ are mutually prime, all pilot tones can be visited in one period Consider only $\delta \leq \text{floor}(\Delta/2)=15$ since otherwise yields equivalent but reversed sequence. Actually $\{SC_0^{(n)}, SC_1^{(n)}, SC_2^{(n)}, SC_3^{(n)}\}=-\{SC_4^{(P-n)}, SC_5^{(P-n)}, SC_6^{(P-n)}, SC_1^{(P-n)}\}$;

Choose $\delta$ for large inter-symbol distance;
  i.e., avoid numbers near $\Delta/2, \Delta/3, \Delta/4$, etc.;
  $\delta=13$ is shown in the table of FIG. 9C (only show first 30 columns since periodicity P=121 is large;

First subset $\{\pm 21, \pm 51, \pm 81, \pm 111, \pm 145, \pm 175, \pm 205, \pm 235\}$ is different from fixed pilots in 11ac $\{\pm 25, \pm 53, \pm 89, \pm 117, \pm 139, \pm 167, \pm 203, \pm 231\}$;
  The latter is not evenly spaced;
  The proposed scheme is compatible with non-contiguous 16 MHz scenario;

Direct formula $SC_i^{(n)}=\text{sign}(SC_i^{(0)})*(\text{mod}\{\text{sign}(SC_i^{(0)})*(SC_i^{(n-1)}+\delta)-s, N_{ST}/2\}+s)$ does not apply due to the mid-band holes around $\pm 128$;

However, 16 MHz band can be treated as two contiguous 8 MHz bands;

Generate 8 MHz pilot subcarrier indices first, then shift by $\pm 128$.

The actual pilot signals sent over a tone may be selected in different ways. In one aspect, the pilot signals may have all the same values for each of the symbols. This may be appropriate as the pilots do not stay on the same tones on adjacent symbols, thereby reducing the possibility of spectral lines. In another aspect, pilot signals may be selected based on a modified method of selecting pilot value signals described in section 23.2.10.10 of the 802.11ah standard. For example, normally, the pilot signals in a symbol are normally mapped to particular subcarrier indices (tones). However, instead of mapping pilot signals to a particular tone, the pilot signals for a symbol may be mapped to a tone index, where the tone associated with the tone index changes per each symbol as discussed above.

In some aspects, it may be beneficial to use a walking pilot pattern which has a shorter walking period. For example, it may be beneficial in high Doppler environments to use a walking pilot pattern which has a shorter walking period and a reduced cycle length. This reduced cycle length may improve high Doppler performance by shortening the walking period and by reducing channel age.

This reduced cycle length may necessitate interpolation, as during a cycle, not every tone will receive a pilot signal. For example, the cycle may only send pilot signals to one-half, on-quarter, or another fractional portion of the tones. Because some tones would not receive pilot signals, these tones would need to rely upon interpolation of adjacent tones. Interpolation of adjacent tones may introduce some level of interpolation error into the receipt of the signal. It may be beneficial to use a full cycle length, rather than a reduced cycle length, in no-, low-, and medium-Doppler situations, as in these situations, the value of using a full cycle, reducing or eliminating the need for interpolation, may outweigh the cost, of having a longer walking period and a higher channel age.

In order to reduce cycle length, the walking pattern may result in only a portion of the tones receiving pilot signals. There may be many ways to select which pilot signals receive a tone. For example, a walking pattern may be chosen that results in only the odd-numbered tones receiving a pilot signal, or one in which only the even-numbered tones receive a pilot signal. A walking pattern may also be chosen such that only tones divisible by 3, 4, 5, 7, or 8 receive a pilot signal. This choice may affect the length of the cycle. For example, if only half the tones receive a pilot signal, the cycle length may be half as long. It may be beneficial to select a walking pattern such that the tones which do not receive a pilot signal are evenly spaced between the tones that receive a walking signal, as this may improve the accuracy of interpolation, and may reduce interpolation errors.

In some aspects, to allow for a reduced cycle length, the tones for each symbol are selected according to the following function:

$$SC_i^{(n)}=\text{clip}[\text{sign}(SC_i^{(0)})*(\text{mod}\{\text{sign}(SC_i^{(0)})*(SC_i^{(n-1)}+\delta)-s, N'_{ST}/2\}+s)]$$

where i is the pilot index taking values between 0 and NSP−1, n is the subset index, $\delta$ is the offset, s=0 is hard-coded to zero, and where N'ST={28,56,120,256} or {28,56,120,240}, NSP={2,4,6,8}, for BW={1,2,4,8}MHz.

A clip[*] function may be necessary to clip 4 and 8 MHz tones to the proper range. The clip[*] function may work be determining whether the value of $SC_i^{(n)}$ would be a tone that is out of range, such as a DC tone or a guard tone. In the situation that $SC_i^{(n)}$ would be a tone that is out of range, the clip[*] function may return the nearest valid tone with the same sign, positive or negative, as $SC_i^{(n-1)}$. For the 16 MHz bandwidth scenario, the formula for 8 MHz may be used, with the 16 MHz bandwidth being treated as two contiguous 8 MHz bands.

The use of a closed-form expression to determine which tones contain pilot symbols may be advantageous. This closed-form expression may allow a device to determine which tones may receive pilot signals in the next symbol without having to use a look up table or keep track of a symbol index. This closed-form expression may also visit all tones to be visited (such as, e.g., all odd tones or all even tones) an equal number of times in the shortest period of time possible. This may result in a shorter walking period for each tone.

Table 5 below shows an example of an initial subset and choices for δ which may result in a reduced cycle length.

TABLE 5

| | BW | | | | |
|---|---|---|---|---|---|
| | 1(B) | 2(B) | 4(B) | 8(B) | 8(C) |
| $SC_i^{(0)}$ | −7, 7 −3, 11 | −21, −7, 7, 21 −17, −3, 11, 25 | −50, −30, −10, 10, 30, 50 | −107, −77, −47, −17, 17, 47, 77, 107 | −112, −80, −48, −16, 16, 48, 80, 112 |
| δ | 4 | 4 | 6 or 8 | 8 | 12 |

In these exemplary choices of $SC_i^{(0)}$ and δ, it may be observed that the chosen δ is always an even number. The choice of δ here may ensure that if the values for $SC_i^{(n)}$ are odd, the values for $SC_i^{(n+1)}$ will also be odd, and similarly, if the values for $SC_i^{(n)}$ are even, the values for $SC_i^{(n+1)}$ will also be even. This may allow, for example, only the even- or odd-numbered tones to receive a pilot signal in a cycle. It may also be advantageous to choose values of δ that are larger than 1 in order to spread out pilot signal locations, in order to spread out pilots and help reduce the impact of fading.

FIG. 5E is a table illustrating one example of assigning pilot signals to tones in a 1 MHz bandwidth OFDM communications network, using a reduced cycle length. As shown, each column indicates a symbol used for transmission of pilot signals. Further, each row indicates a tone used for transmission of a pilot signal in the given symbol. The 1 MHz bandwidth system includes 26 tones. Further, 2 tones are used for transmission of pilot signals per symbol. Accordingly 26/2=13 symbols are needed to transmit a pilot signal over each of the 26 tones. However, in this reduced cycle length, only 7 symbols are needed to complete a cycle. In this example, only odd-numbered tones transmit pilot signals. Even-numbered tones do not transmit a pilot signal at any point during the cycle, because the initial values of $SC_i^{(0)}$ are odd {7, −7}, and because δ is even (4). Because even-numbered tones do not transmit a pilot signal during the cycle, even-numbered tones require interpolation of nearby odd numbered tones. The symbols are labeled with index values 0-6. The symbols may be transmitted sequentially from index 0-6. Further, transmission of the symbols may be done in a round robin fashion, meaning that when symbol index 6 is reached, transmission of the pilot signals restarts at symbol index 0 and proceeds sequentially again. The pilot signals are also indexed, with 2 indices per symbol (0 and 1). It should be noted that the order of the pilot indexes for a given symbol is not important as the value of each table element is a tone over which a pilot signal is to be transmitted for the given symbol.

FIG. 5F is another table illustrating one example of assigning pilot signals to tones in a 1 MHz bandwidth OFDM communications network, using a reduced cycle length. This table is similar to that in FIG. 5E, but with a different choice of $SC_i^{(0)}$. As in FIG. 5E, the walking pattern here means that only odd-numbers tones receive pilot signals, while even-numbered tones must use interpolation. As before, this results in a reduced cycle length of 7 symbols versus 13 symbols for a full cycle length which includes a pilot signal for each tone.

FIG. 6E is a table illustrating one example of assigning pilot signals to tones in a 2 MHz bandwidth OFDM communications network, using a reduced cycle length. As shown, each column indicates a symbol used for transmission of pilot signals. Further, each row indicates a tone used for transmission of a pilot signal in the given symbol. The 2 MHz bandwidth system includes 56 tones. Further, 4 tones are used for transmission of pilot signals per symbol. Accordingly 56/4=14 symbols are needed to transmit a pilot signal over each of the 56 tones. However, in this reduced cycle length, only 7 symbols are needed to complete a cycle. In this example, only odd-numbered tones transmit pilot signals. Even-numbered tones do not transmit a pilot signal at any point during the cycle, because the initial values of $SC_i^{(0)}$ are odd {−21, −7, 7, 21}, and because δ is even (4). Because even-numbered tones do not transmit a pilot signal during the cycle, even-numbered tones require interpolation of nearby odd numbered tones. The symbols are labeled with index values 0-6. The symbols may be transmitted sequentially from index 0-6. Further, transmission of the symbols may be done in a round robin fashion, meaning that when symbol index 6 is reached, transmission of the pilot signals restarts at symbol index 0 and proceeds sequentially again. The pilot signals are also indexed, with 4 indices per symbol (0, 1, 2, 3). It should be noted that the order of the pilot indexes for a given symbol is not important as the value of each table element is a tone over which a pilot signal is to be transmitted for the given symbol.

FIG. 6F is another table illustrating one example of assigning pilot signals to tones in a 2 MHz bandwidth OFDM communications network, using a reduced cycle length. This table is similar to that in FIG. 6E, but with a different choice of $SC_i^{(0)}$. As in FIG. 6E, the walking pattern here means that only odd-numbers tones receive pilot signals, while even-numbered tones must use interpolation. As before, this results in a reduced cycle length of 7 symbols versus 14 symbols for a full cycle length which includes a pilot signal for each tone.

FIG. 7D is a table illustrating one example of assigning pilot signals to tones in a 4 MHz bandwidth OFDM communications network, using a reduced cycle length. As shown, each column indicates a symbol used for transmission of pilot signals. Further, each row indicates a tone used for transmission of a pilot signal in the given symbol. The 4 MHz bandwidth system includes 114 tones. Further, 6 tones are used for transmission of pilot signals per symbol. Accordingly 114/6=19 symbols are needed to transmit a pilot signal over each of the 114 tones. However, in this reduced cycle length, only 10 symbols are needed to complete a cycle. In this example, only even-numbered tones transmit pilot signals. Odd-numbered tones do not transmit a pilot signal at any point during the cycle, because the initial values of $SC_i^{(0)}$ are even $\{-50, -30, -10, 10, 30, 50\}$, and because δ is even (6) (as illustrated as a first option for δ in Table 5). Because odd-numbered tones do not transmit a pilot signal during the cycle, odd-numbered tones require interpolation of nearby even-numbered tones. The symbols are labeled with index values 0-9. The symbols may be transmitted sequentially from index 0-9. Further, transmission of the symbols may be done in a round robin fashion, meaning that when symbol index 9 is reached, transmission of the pilot signals restarts at symbol index 0 and proceeds sequentially again. The pilot signals are also indexed, with 6 indices per symbol (0, 1, 2, 3, 4, 5). It should be noted that the order of the pilot indexes for a given symbol is not important as the value of each table element is a tone over which a pilot signal is to be transmitted for the given symbol.

In FIG. 7D, the use of the clip[*] function may be seen in symbol 5, at the pilot signal locations 720A and 720B. At pilot signal location 720A, the use of the formula above without the clip[*] function would return a result of 0, as the previous pilot signal location of −6 would be added to the offset δ of 6, yielding a sum of zero. However, because 0 is a value outside the proper range of tones (−1, 0, and 1 are DC tones), the clip[*] function will convert the returned value of 0 to the nearest proper tone value that shares a sign with the previous pilot signal location. For example, for the pilot signal location 720A, the previous pilot signal location was −6. This means that the nearest proper tone value that shares a sign with −6 is −2, and so, the clip[*] function will convert 0 to -2. In a similar way, at pilot signal location 720B, the clip[*] function will convert 0 to 2, as 0 is not an proper pilot signal location. As another example, instead of a result of 0 being in pilot signal locations 720A and 720B, a result of −58 may be returned for the pilot signal location 720A and a result of and +58 may be returned for the pilot signal location 720B. In this example, at signal location 720A, the nearest proper tone value that shares a sign with −54 is −60, and so, the clip[*] function will convert −58 to −60. Similarly, at pilot signal location 720B, the clip[*] function will convert 58 to 60, as 58 is not an proper pilot signal location.

FIG. 7E is a table illustrating another example of assigning pilot signals to tones in a 4 MHz bandwidth OFDM communications network, using a reduced cycle length. As shown, each column indicates a symbol used for transmission of pilot signals. Further, each row indicates a tone used for transmission of a pilot signal in the given symbol. The 4 MHz bandwidth system includes 114 tones. Further, 6 tones are used for transmission of pilot signals per symbol. Accordingly 114/6=19 symbols are needed to transmit a pilot signal over each of the 114 tones. However, in this reduced cycle length as illustrated in FIG. 7E, only 5 symbols are needed. In this example, only even-numbered tones transmit pilot signals. Odd-numbered tones do not transmit a pilot signal at any point during the cycle, because the initial values of $SC_i^{(0)}$ are even $\{-50, -30, -10, 10, 30, 50\}$, and because δ is even (8) (as illustrated as a second option for δ in Table 5). Because odd-numbered tones do not transmit a pilot signal during the cycle, odd-numbered tones require interpolation of nearby even-numbered tones. The symbols are labeled with index values 0-4. The symbols may be transmitted sequentially from index 0-4. Further, transmission of the symbols may be done in a round robin fashion, meaning that when symbol index 4 is reached, transmission of the pilot signals restarts at symbol index 0 and proceeds sequentially again. The pilot signals are also indexed, with 6 indices per symbol (0, 1, 2, 3, 4, 5). It should be noted that the order of the pilot indexes for a given symbol is not important as the value of each table element is a tone over which a pilot signal is to be transmitted for the given symbol.

FIG. 8E is a table illustrating one example of assigning pilot signals to tones in a 8 MHz bandwidth OFDM communications network, using a reduced cycle length. As shown, each column indicates a symbol used for transmission of pilot signals. Further, each row indicates a tone used for transmission of a pilot signal in the given symbol. The 8 MHz bandwidth system includes 242 tones. Further, 8 tones are used for transmission of pilot signals per symbol. Accordingly 242/8=30.25 symbols are needed to transmit a pilot signal over each of the 242 tones. However, in this reduced cycle length, only 16 symbols are needed to complete a cycle. In this example, only even-numbered tones transmit pilot signals. Odd-numbered tones do not transmit a pilot signal at any point during the cycle, because the initial values of $SC_i^{(0)}$ are even $\{-112, -80, -48, -16, 16, 48, 80, 120\}$, and because δ is even (10). Because odd-numbered tones do not transmit a pilot signal during the cycle, odd-numbered tones require interpolation of nearby even-numbered tones. The symbols are labeled with index values 0-15. The symbols may be transmitted sequentially from index 0-15. Further, transmission of the symbols may be done in a round robin fashion, meaning that when symbol index 15 is reached, transmission of the pilot signals restarts at symbol index 0 and proceeds sequentially again. The pilot signals are also indexed, with 8 indices per symbol (0, 1, 2, 3, 4, 5, 6, 7). It should be noted that the order of the pilot indexes for a given symbol is not important as the value of each table element is a tone over which a pilot signal is to be transmitted for the given symbol.

In FIG. 8E, the use of the clip[*] function may be seen in symbols 2, 5, 8, 11, and 14. At pilot signal location 820A, the use of the formula above without the clip[*] function would return a result of −124, as the previous pilot signal location of −6 would be added to the offset δ of 10, yielding, after modulus, −124. However, because −124 is a value outside the proper range of tones (−124 is a guide tone in an 8 MHz bandwidth system), the clip[*] function will convert the returned value of −124 to the nearest proper even tone value that shares a sign with the previous pilot signal location. For the pilot signal location 820A, the previous pilot signal location was −6. This means that the nearest proper tone value to −124 that shares a sign with −6 is −122, and so, the clip[*] function will convert −124 to −122. In a similar way, at pilot signal location 820B, the clip[*] function will convert 0 to 2, as 0 is not an proper pilot signal location because 0 is a DC tone in an 8 MHz bandwidth system, and because 2 is the nearest proper tone to 0 which shares a sign with the previous pilot signal location of 118.

FIG. 8F is another table illustrating one example of assigning pilot signals to tones in a 8 MHz bandwidth OFDM communications network, using a reduced cycle length. As shown, each column indicates a symbol used for transmission of pilot signals. Further, each row indicates a tone used for transmission of a pilot signal in the given symbol. The 8 MHz bandwidth system includes 242 tones. Further, 8 tones are used for transmission of pilot signals per symbol. Accordingly 242/8=30.25 symbols are needed to transmit a pilot signal over each of the 242 tones. However, in this reduced cycle length, only 8 symbols are needed to complete a cycle. In this example, only one-quarter of the tones receive a pilot signal, because of the selection of the initial values of $SC_i^{(0)}$ {−112, −80, −48, −16, 16, 48, 80, 120}, and the selection of δ (12). Because three-quarters of the tones do not transmit a pilot signal during the cycle, these tones require interpolation of nearby tones which do transmit a pilot signal. The symbols are labeled with index values 0-7. The symbols may be transmitted sequentially from index 0-7. Further, transmission of the symbols may be done in a round robin fashion, meaning that when symbol index 7 is reached, transmission of the pilot signals restarts at symbol index 0 and proceeds sequentially again. The pilot signals are also indexed, with 8 indices per symbol (0, 1, 2, 3, 4, 5, 6, 7). It should be noted that the order of the pilot indexes for a given symbol is not important as the value of each table element is a tone over which a pilot signal is to be transmitted for the given symbol.

In FIG. 8F, the use of the clip[*] function may be seen in symbols 1, 4, and 7. At pilot signal location 822A, the use of the formula above without the clip[*] function would return a result of 124, as the previous pilot signal location of 112 would be added to the offset δ of 12, yielding 124. However, because 124 is a value outside the proper range of tones (124 is a guide tone in an 8 MHz bandwidth system), the clip[*] function will convert the returned value of 124 to the nearest proper even tone value that shares a sign with the previous pilot signal location. For the pilot signal location 822A, the previous pilot signal location was 112. This means that the nearest proper tone value to 124 that shares a sign with 112 is 122, and so, the clip[*] function will convert 124 to 122. In a similar way, at pilot signal location 822B, the clip[*] function will convert 0 to 2, as 0 is not an proper pilot signal location because 0 is a DC tone in an 8 MHz bandwidth system, and because 2 is the nearest proper tone to 0 which shares a sign with the previous pilot signal location of 116.

FIG. 8G is another table illustrating one example of assigning pilot signals to tones in a 8 MHz bandwidth OFDM communications network corresponding to the first option in Table 4 (SCi(0)=−107, −77, −47, −17, 17, 47, 77, 107 with an offset of 13). As shown in FIG. 8G, each column indicates a symbol used for transmission of pilot signals. Further, each row indicates a tone used for transmission of a pilot signal in the given symbol. The 8 MHz bandwidth system illustrated in FIG. 8G includes 240 tones because certain tones may be ignored. Further, 8 tones are used for transmission of pilot signals per symbol. Accordingly 240/8=30 symbols are needed to transmit a pilot signal over each of the 240 tones. As an example, FIG. 8G illustrates that tones ±122 may be ignored, resulting in 30 symbols be utilized.

Figure 8H:
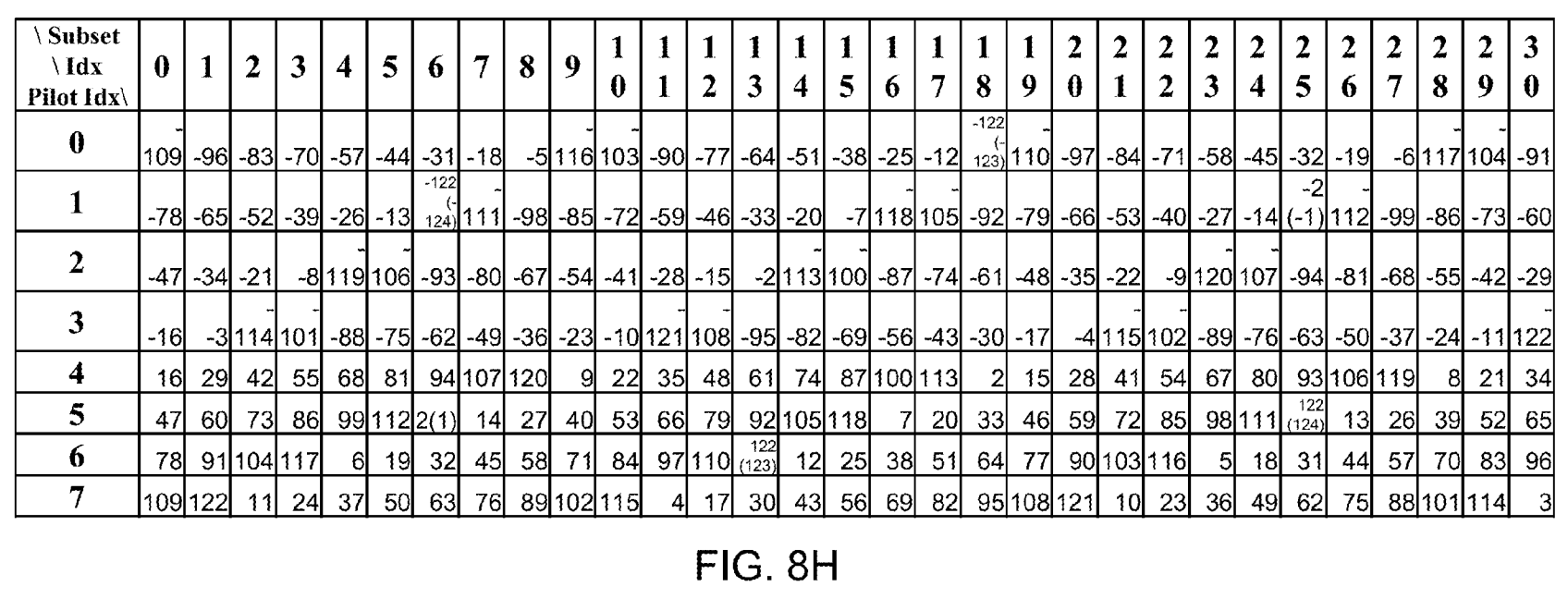

FIG. 8H is another table illustrating one example of assigning pilot signals to tones in a 8 MHz bandwidth OFDM communications network corresponding to the second option in Table 4 (SCi(0)=−109, −78, −47, −16, 16, 47, 78, 109 with an offset of 13). As shown, each column indicates a symbol used for transmission of pilot signals. Further, each row indicates a tone used for transmission of a pilot signal in the given symbol. The 8 MHz bandwidth system illustrated in FIG. 8H includes 242 tones. Further, 8 tones are used for transmission of pilot signals per symbol. Accordingly 242/8=30.25 symbols are needed to transmit a pilot signal over each of the 242 tones. In the table illustrated in FIG. 8H, certain tones are repeated. For example, tones ±2 and ±122 are repeated in symbols 6, 13, 18, and 25.

FIG. 8I is another table illustrating one example of assigning pilot signals to tones in a 8 MHz bandwidth OFDM communications network using a reduced cycle length and corresponding to the first option in Table 5 (SCi(0)=−107, −77, −47, −17, 17, 47, 77, 107 with an offset of 8). As shown, each column indicates a symbol used for transmission of pilot signals. Further, each row indicates a tone used for transmission of a pilot signal in the given symbol. The 8 MHz bandwidth system illustrated in FIG. 8I includes 242 tones. Further, 8 tones are used for transmission of pilot signals per symbol. Accordingly 242/8=30.25 symbols are needed to transmit a pilot signal over each of the 242 tones. However, in this reduced cycle length as illustrated in FIG. 8I, only 15 symbols are needed. In this example, only odd-numbered tones transmit pilot signals. Even-numbered tones do not transmit a pilot signal at any point during the cycle, because the initial values of $SC_i^{(0)}$ are odd {−107, −77, −47, −17, 17, 47, 77, 107}, and because δ is even (8) (as illustrated as the first option for δ in Table 5). Because even-numbered tones do not transmit a pilot signal during the cycle, even-numbered tones require interpolation of nearby odd-numbered tones. The symbols are labeled with index values 0-14. The symbols may be transmitted sequentially from index 0-14. Further, transmission of the symbols may be done in a round robin fashion, meaning that when symbol index 14 is reached, transmission of the pilot signals restarts at symbol index 0 and proceeds sequentially again. The pilot signals are also indexed, with 8 indices per symbol (0, 1, 2, 3, 4, 5, 6, 7). It should be noted that the order of the pilot indexes for a given symbol is not important as the value of each table element is a tone over which a pilot signal is to be transmitted for the given symbol.

FIG. 8J is another table illustrating one example of assigning pilot signals to tones in a 8 MHz bandwidth OFDM communications network using a reduced cycle length and corresponding to the second option in Table 5 (SCi(0)=−112, −80, −48, −16, 16, 48, 80, 112 with an offset of 12). As shown, each column indicates a symbol used for transmission of pilot signals. Further, each row indicates a tone used for transmission of a pilot signal in the given symbol. The 8 MHz bandwidth system illustrated in FIG. 8J includes 242 tones. Further, 8 tones are used for transmission of pilot signals per symbol. Accordingly 242/8=30.25 symbols are needed to transmit a pilot signal over each of the 242 tones. However, in this reduced cycle length as illustrated in FIG. 8J, only 8 symbols are needed. In this example, only even-numbered tones transmit pilot signals. Odd-numbered tones do not transmit a pilot signal at any point during the cycle, because the initial values of $SC_i^{(0)}$ are even {−112, −80, −48, −16, 16, 48, 80, 112}, and because δ is even (12) (as illustrated as the second option for δ in Table 5). Because odd-numbered tones do not transmit a pilot signal during the cycle, odd-numbered tones require interpolation of nearby even-numbered tones. The symbols are labeled with index values 0-7. The symbols may be transmitted sequentially from index 0-7. Further, transmission of the symbols may be done in a round robin fashion, meaning that when symbol index 7 is reached, transmission of the pilot signals restarts at symbol index 0 and proceeds sequentially again. The pilot signals are also indexed, with 8 indices per symbol (0, 1, 2, 3, 4, 5, 6, 7). It should be noted that the order of the pilot indexes for a given symbol is not important as the value of each table element is a tone over which a pilot signal is to be transmitted for the given symbol.

In FIG. 8J, the use of the clip[*] function may be seen in symbols 2, 4, and 7. At pilot signal location 824A, the use of the formula above without the clip[*] function would return a result of 122, as the previous pilot signal location of 112 would be added to the offset δ of 12, yielding, after modulus, 124. However, because 124 is a value outside the proper range of tones, the clip[*] function will convert the returned value of 124 to the nearest proper even tone value that shares a sign with the previous pilot signal location. For the pilot signal location 824A, the previous pilot signal location was 112. This means that the nearest proper tone value to 124 that shares a sign with 112 is 122, and so, the clip[*] function will convert 124 to 122. In a similar way, at pilot signal location 824B, the clip[*] function will convert 0 to 2, as 0 is not an proper pilot signal location because 0 is a DC tone in an 8 MHz bandwidth system, and because 2 is the nearest proper tone to 0 which shares a sign with the previous pilot signal location of 116.

In addition, the pilot indices mapped to symbols as described above and shown in FIGS. 5-9, may be used in MIMO implementations. For example, in one implementation, MIMO may be supported via interpolation. The interpolation may be done based on the schemes for pilot indices described above. In one aspect, the schemes for pilot indices described herein may provide various advantages for use in conjunction with MIMO and interpolation due to balancing of pilot deployment in time and frequency and described above and shown in FIGS. 5-10. For example, pilots may move every OFDM symbol and it make take less than 20 symbols to update all tones for 1/2/4 MHz bandwidth OFDM communications. With MIMO, a pilot updating period may increase proportional to the number of streams. Furthermore, as described above and shown in FIGS. 5-10, offset values may be greater than one. In one aspect, offsets greater than one may provide various benefits for interpolation in conjunction with MIMO. For example, with an offset equal to one, a recently updated neighbor may only exist on one side of a frequency domain but not on the other side which may result in unreliable interpolation.

Table 6 below illustrates an example of a space time block coding scheme that includes staying at a same pilot location for additional STSs for sensing multiple antennas (e.g., in a MIMO implementation). Table 7 illustrates different options that are available to meet a coherence time constraint.

With reference to Table 6, the cycle of walking pilot patterns increases proportionally to a number of space time streams (STSs). Options A-C may be chosen in order to meet a coherence time constraint. The scheme illustrated in Table 7 is flexible enough to accommodate either time division multiple access (TDMA) or code division multiple access (CDMA) for channel estimation. For example, with TDMA for channel estimation, one antenna may transmit pilots with normalized power at a certain OFDM symbol. As another example, with CDMA for channel estimation, all antennas transmit a pilot with an orthogonal mapping matrix for every group of 1/2/4 symbols. The scheme of Table 7 allows the system to handle 3 STSs. Further, the interpolation pattern may be the same for all antennas.

Another STBC scheme may choose a different initial pilot location for STSs 1, 2, 3, and 4 instead of staying on the same pilot location for additional STSs. For example, initial pilot locations for a 2 MHz BW may be {-21, -7, 7, 21} for a first STS, then {-19, -5, 9, 23} for a second STS, {-20, -6, 8, 22} for a third STS, and {-18, -4, 10, 24} for a fourth STS. The interpolation pattern may be different for different STSs in this scheme.

Figure 10:
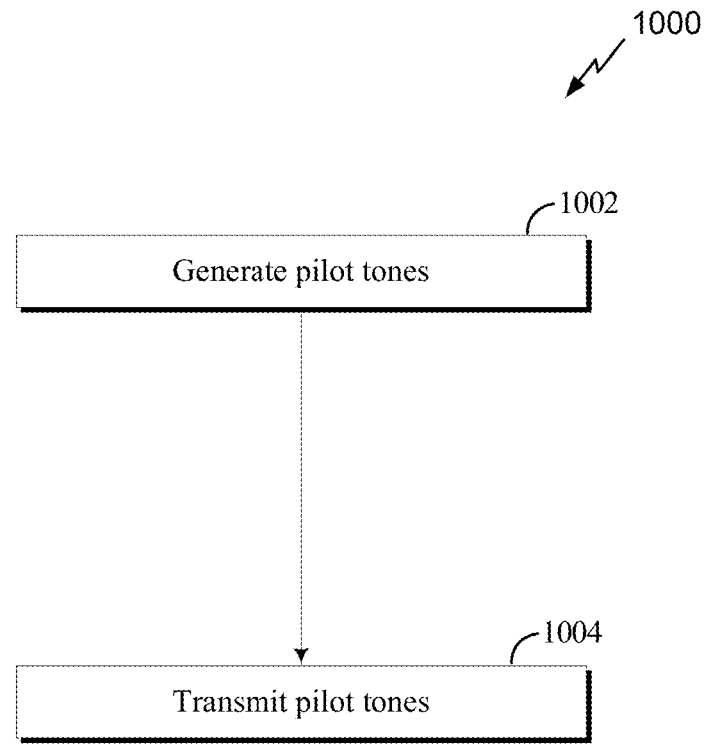
FIG. 10 shows a flowchart of exemplary method for transmitting pilot tones.

FIG. 10 shows a flowchart of exemplary method for transmitting pilot tones. In block 1002, the method includes generating pilot signals for transmission on tones according to the aspects described herein. In block 1004, the pilot signals are transmitted.

Figure 11:
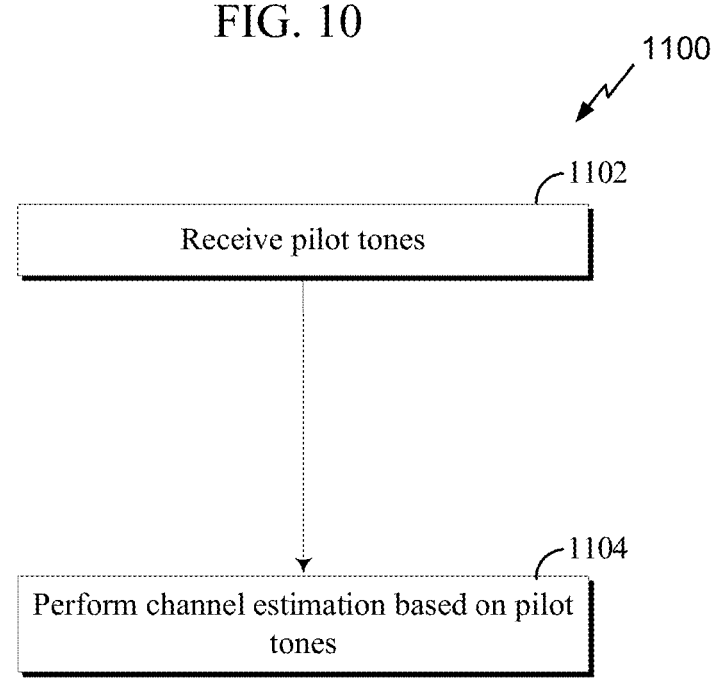
FIG. 11 shows a flowchart of exemplary method for receiving pilot tones.

FIG. 11 shows a flowchart of exemplary method for receiving pilot tones. In block 1102, the method includes receiving pilot signals on one or more tones. In block 1104, the pilot signals are used for channel estimation.

Figure 12:
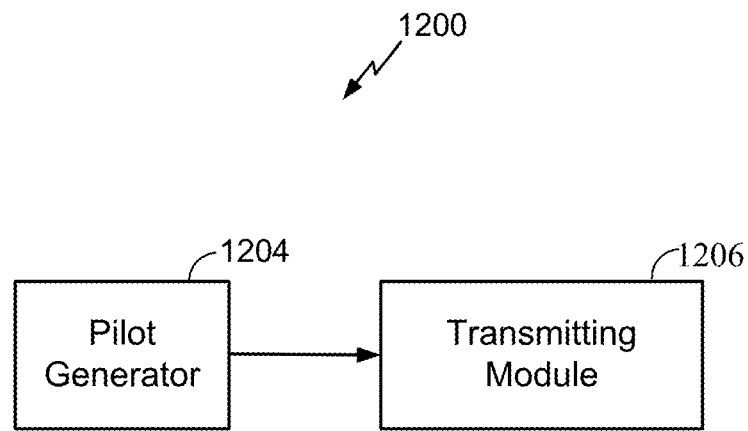
FIG. 12 is a functional block diagram of another exemplary wireless device 1200 that may be employed within the wireless communication system 100.

FIG. 12 is a functional block diagram of another exemplary wireless device 1200 that may be employed within the wireless communication system 100. Those skilled in the art will appreciate that a wireless communication device may have more components than the wireless communication device shown in FIG. 12. The wireless communication device 1200 shown includes only those components useful for describing some prominent features of certain implementations. The device 1200 includes pilot generator 1204 for generating pilot signals for transmission on tones according to the aspects described herein. The pilot generator 1204 may be configured to perform one or more of the functions discussed above with respect to the block 1002 illustrated in FIG. 10. The pilot generator 1204 may correspond to the processor 204. In some cases a means for generating may

TABLE 6

| | 1 MHz, 32FFT | | | 2 MHz, 64FFT | | | 4 MHz, 128FFT | | | 8 MHz, 256FFT | | | 16 MHz, 512FFT | | |
|---|---|---|---|---|---|---|---|---|---|---|---|---|---|---|---|
| No. of STSs | 1 | 2 | 4 | 1 | 2 | 4 | 1 | 2 | 4 | 1 | 2 | 4 | 1 | 2 | 4 |
| No. of symbols required to cover all tones with pilots - Option A | 13 | 26 | 52 | 14 | 28 | 56 | 19 | 38 | 76 | 30 | 60 | 120 | 30 | 60 | 120 |
| No. of symbols required to cover all tones with pilots - Option B | 7 | 14 | 28 | 7 | 14 | 28 | 10 | 20 | 40 | 15 | 30 | 60 | 15 | 30 | 60 |
| No. of symbols required to cover all tones with pilots - Option C | | | | | | | 5 | 10 | 20 | 8 | 16 | 32 | 8 | 16 | 32 | include the pilot generator 1204. The device 1200 further comprises a transmitting module 1206 for wirelessly transmitting the generated pilot signals. The transmitting module 1206 may be configured to perform one or more of the functions discussed above with respect to the block 1004 illustrated in FIG. 10. The transmitting module 1206 may correspond to the transmitter 210. In some cases, a means for transmitting may include the transmitting module 1206.

Figure 13:
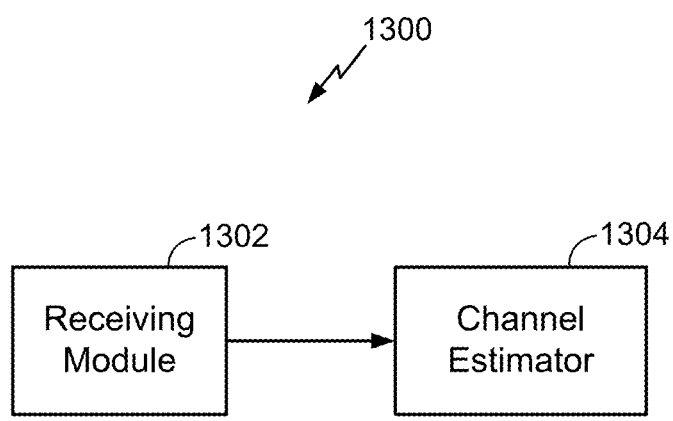
FIG. 13 is a functional block diagram of yet another exemplary wireless device 1300 that may be employed within the wireless communication system 100.

FIG. 13 is a functional block diagram of yet another exemplary wireless device 1300 that may be employed within the wireless communication system 100. The device 1300 comprises a receiving module 1302 for wirelessly receiving data. The receiving module 1302 may be configured to perform one or more of the functions discussed above with respect to the block 1102 illustrated in FIG. 11. The receiving module 1302 may correspond to the receiver 212. In some cases, a means for receiving may include the receiving module 1302. The device 1300 further comprises a channel estimator 1304 for estimating channel information based on the received data. The channel estimator 1304 ay be configured to perform one or more of the functions discussed above with respect to the block 1104 illustrated in FIG. 11. In some cases a means for channel estimating may include the channel estimator 1304.

Figure 14:
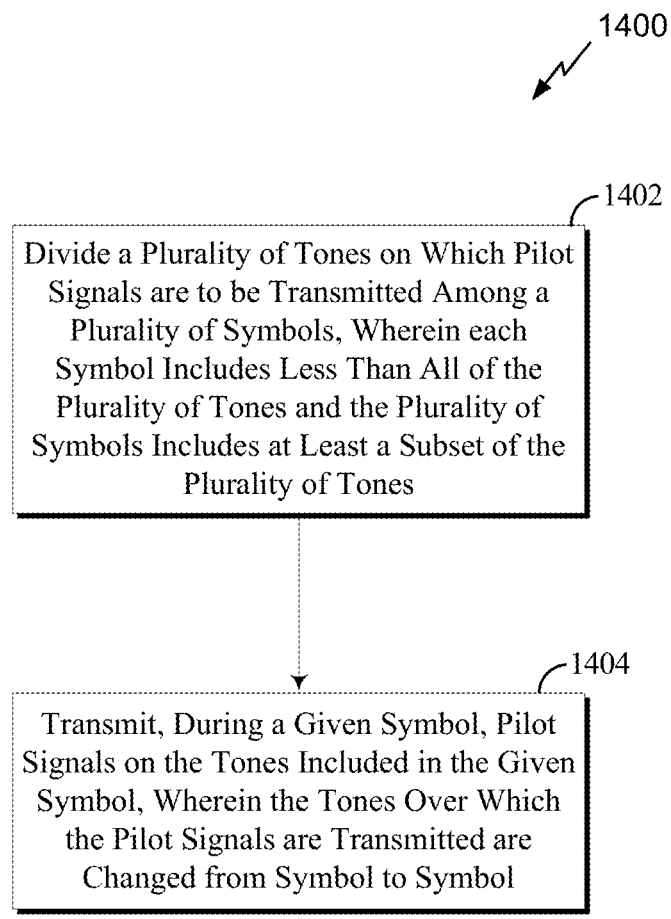
FIG. 14 shows a flowchart of exemplary method of communicating in a wireless network.

FIG. 14 illustrates a flowchart of exemplary method of communicating in a wireless network. In block 1402, the method includes dividing a plurality of tones on which pilot signals are to be transmitted among a plurality of symbols, wherein each symbol includes less than all of the plurality of tones and the plurality of symbols includes at least a subset of the plurality of tones. In block 1404, the method includes transmitting, during a given symbol, pilot signals on the tones included in the given symbol, wherein the tones over which the pilot signals are transmitted are changed from symbol to symbol. In some aspects, the subset of the plurality of tones comprises half of the tones. In some aspects, the half of the tones may include either the even-numbered tones or the odd-numbered tones. In some aspects, the plurality of symbols includes all of the plurality of tones. In some aspects, the method may divide the plurality of symbols into a plurality of groups. In some aspects, method may transmit the pilot signals during the symbols of a first group of the plurality of groups, wherein channel estimation is performed based on the first group of the plurality of groups. In some aspects, one of symbols of the plurality of symbols is repeated in the plurality of symbols. In some aspects, the method may transmit the plurality of symbols sequentially and in a round robin fashion. In some aspects, the tones are divided among the symbols based on at least one of the following criteria: maximizing intra-symbol distances between tones, and maximizing inter-symbol distances between tones.

Figure 15:
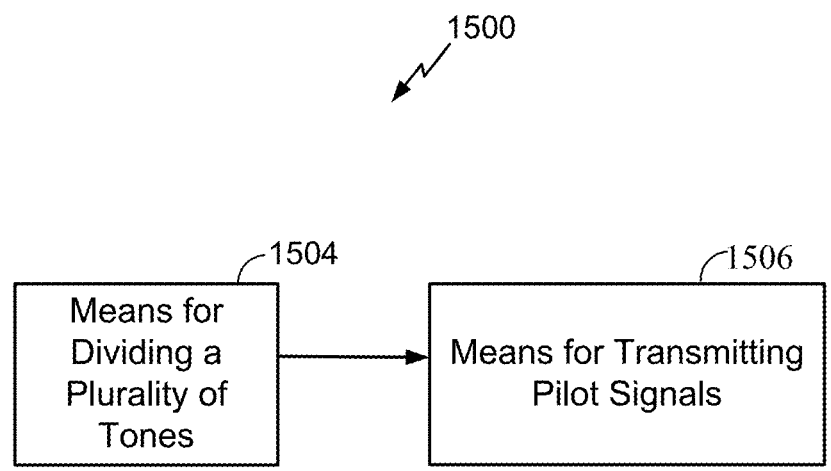
FIG. 15 is a functional block diagram of yet another exemplary wireless device 1500 that may be employed within the wireless communication system 100.

FIG. 15 is a functional block diagram of another exemplary wireless device 1500 that may be employed within the wireless communication system 100. Those skilled in the art will appreciate that a wireless communication device may have more components than the wireless communication device 1500 shown in FIG. 15. The wireless communication device 1500 shown includes only those components useful for describing some prominent features of certain implementations. The device 1500 includes a means 1504 for dividing a plurality of tones on which pilot signals are to be transmitted among a plurality of symbols, wherein each symbol includes less than all of the plurality of tones and the plurality of symbols includes at least a subset of the plurality of tones. The means 1504 for dividing a plurality of tones may be configured to perform one or more of the functions discussed above with respect to the block 1402 illustrated in FIG. 14. The means 1504 for dividing a plurality of tones may correspond to the processor 204. The device 1500 further comprises a means 1506 for transmitting, during a given symbol, pilot signals on the tones included in the given symbol, wherein the tones over which the pilot signals are transmitted are changed from symbol to symbol. The means 1506 for transmitting pilot signals may be configured to perform one or more of the functions discussed above with respect to the block 1404 illustrated in FIG. 14. The means 1506 for transmitting pilot signals may correspond to the transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless communications apparatus comprising:
a processor configured to divide a plurality of tones on which pilot signals are to be transmitted among thirteen symbols, wherein the divided plurality of tones includes twenty-six possible tone locations consisting of {−13, −12, −11, −10, −9, −8, −7, −6, −5, −4, −3, −2, −1, 1, 2, 3, 4, 5, 6, 7, 8, 9, 10, 11, 12, 13}, and each symbol includes a pilot signal on less than all of the divided plurality of tones; and
a transmitter configured to transmit, during a given symbol, the pilot signals on the tones included in the given symbol, wherein the divided plurality of tones over which the pilot signals are transmitted are changed by a fixed offset of eight tones from symbol to symbol for at least half of the divided plurality of tones, and wherein the divided plurality of tones over which the pilot signals are transmitted among the thirteen symbols are selected to comprise:

| Pilot Idx\Pattern Idx | 0 | 1 | 2 | 3 | 4 | 5 | 6 |
|---|---|---|---|---|---|---|---|
| 0 | −2 | −10 | −5 | −13 | −8 | −3 | −11 |
| 1 | 12 | 4 | 9 | 1 | 6 | 11 | 3 |

| Pilot Idx\Pattern Idx | 7 | 8 | 9 | 10 | 11 | 12 |
|---|---|---|---|---|---|---|
| 0 | −6 | −1 | −9 | −4 | −12 | −7 |
| 1 | 8 | 13 | 5 | 10 | 2 | 7. |

2. The wireless communications apparatus of claim 1, wherein the divided plurality of tones over which the pilot signals are transmitted are changed by the fixed offset of eight tones from symbol to symbol for all of the divided plurality of tones.

3. The wireless communications apparatus of claim 2, wherein the processor is further configured to divide the thirteen symbols into a plurality of groups.

4. The wireless communications apparatus of claim 3, wherein the transmitter is further configured to transmit the pilot signals during symbols of a first group of the plurality of groups, wherein channel estimation is performed based on the first group of the plurality of groups.

5. The wireless communications apparatus of claim 2, wherein one of the thirteen symbols is repeated after the thirteen symbols.

6. The wireless communications apparatus of claim 2, wherein the transmitter is further configured to transmit the thirteen symbols sequentially and in a round robin fashion.

7. The wireless communications apparatus of claim 2, wherein the plurality of tones are divided among the thirteen symbols based on at least one of the following criteria: maximizing intra-symbol distances between the tones, or maximizing inter-symbol distances between the tones.

8. A method of communicating in a wireless network, the method comprising:

dividing a plurality of tones on which pilot signals are to be transmitted among thirteen symbols, wherein the divided plurality of tones includes twenty-six possible tone locations consisting of {−13, −12, −11, −10, −9, −8, −7, −6, −5, −4, −3, −2, −1, 1, 2, 3, 4, 5, 6, 7, 8, 9, 10, 11, 12, 13}, and each symbol includes a pilot signal on less than all of the divided plurality of tones; and transmitting, during a given symbol, the pilot signals on the tones included in the given symbol, wherein the divided plurality of tones over which the pilot signals are transmitted are changed by a fixed offset of eight tones from symbol to symbol for at least half of the divided plurality of tones, and wherein the divided plurality of tones over which the pilot signals are transmitted among the thirteen symbols are selected to comprise:

| Pilot Idx\Pattern Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | | −2 | −10 | −5 | −13 | −8 | −3 | −11 | −6 | −1 | −9 | −4 | −12 | −7 |
| 1 | | 12 | 4 | 9 | 1 | 6 | 11 | 3 | 8 | 13 | 5 | 10 | 2 | 7. |

9. The method of claim 8, wherein the at least half of the divided plurality of tones comprises odd-numbered tones.

10. The method of claim 8, wherein the divided plurality of tones over which the pilot signals are transmitted are changed by the fixed offset of eight tones from symbol to symbol for all of the divided plurality of tones.

11. The method of claim 10, further comprising dividing the thirteen symbols into a plurality of groups.

12. The method of claim 11, further comprising transmitting the pilot signals during symbols of a first group of the plurality of groups, wherein channel estimation is performed based on the first group of the plurality of groups.

13. The method of claim 10, wherein one of the thirteen symbols is repeated after the thirteen symbols.

14. The method of claim 10, further comprising transmitting the thirteen symbols sequentially and in a round robin fashion.

15. The method of claim 10, wherein the plurality of tones are divided among the thirteen symbols based on at least one of the following criteria: maximizing intra-symbol distances between the tones, or maximizing inter-symbol distances between the tones.

16. A wireless communications apparatus comprising:

means for dividing a plurality of tones on which pilot signals are to be transmitted among thirteen symbols, wherein the divided plurality of tones includes twenty-six possible tone locations consisting of {−13, −12, −11, −10, −9, −8, −7, −6, −5, −4, −3, −2, −1, 1, 2, 3, 4, 5, 6, 7, 8, 9, 10, 11, 12, 13}, and each symbol includes a pilot signal on less than all of the divided plurality of tones; and means for transmitting, during a given symbol, the pilot signals on the tones included in the given symbol, wherein the divided plurality of tones over which the pilot signals are transmitted are changed by a fixed offset of eight tones from symbol to symbol for at least half of the divided plurality of tones, and wherein the divided plurality of tones over which the pilot signals are transmitted among the thirteen symbols are selected to comprise:

| Pilot Idx\Pattern Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | | −2 | −10 | −5 | −13 | −8 | −3 | −11 | −6 | −1 | −9 | −4 | −12 | −7 |
| 1 | | 12 | 4 | 9 | 1 | 6 | 11 | 3 | 8 | 13 | 5 | 10 | 2 | 7. |

17. The wireless communications apparatus of claim 16, wherein the at least half of the divided plurality of tones comprises odd-numbered tones.

18. The wireless communications apparatus of claim 16, wherein the divided plurality of tones over which the pilot signals are transmitted are changed by the fixed offset of eight tones from symbol to symbol for all of the divided plurality of tones.

19. The wireless communications apparatus of claim 18, wherein the means for dividing is further configured to divide the thirteen symbols into a plurality of groups.

20. The wireless communications apparatus of claim 19, wherein the means for transmitting is further configured to transmit the pilot signals during symbols of a first group of the plurality of groups, wherein channel estimation is performed based on the first group of the plurality of groups.

21. The wireless communications apparatus of claim 18, wherein one of the thirteen symbols is repeated after the thirteen symbols.

22. The wireless communications apparatus of claim 18, wherein the means for transmitting is further configured to transmit the thirteen symbols sequentially and in a round robin fashion.

23. The wireless communications apparatus of claim 18, wherein the plurality of tones are divided among the thirteen symbols based on at least one of the following criteria: maximizing intra-symbol distances between the tones, or maximizing inter-symbol distances between the tones.

24. A computer program product, comprising:

a non-transitory computer-readable medium comprising:

code for dividing a plurality of tones on which pilot signals are to be transmitted among thirteen symbols, wherein the divided plurality of tones includes twenty-six possible tone locations consisting of {−13, −12, −11, −10, −9, −8, −7, −6, −5, −4, −3, −2, −1, 1, 2, 3, 4, 5, 6, 7, 8, 9, 10, 11, 12, 13}, and each symbol includes a pilot signal on less than all of the divided plurality of tones; and code for transmitting, during a given symbol, the pilot signals on the tones included in the given symbol, wherein the divided plurality of tones over which the pilot signals are transmitted are changed by a fixed offset of eight tones from symbol to symbol for at least half of the divided plurality of tones, and wherein the divided plurality of tones over which the pilot signals are transmitted among the thirteen symbols are selected to comprise:

| Pilot Idx\Pattern Idx | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -2 | -10 | -5 | -13 | -8 | -3 | -11 | -6 | -1 | -9 | -4 | -12 | -7 |
| 1 | 12 | 4 | 9 | 1 | 6 | 11 | 3 | 8 | 13 | 5 | 10 | 2 | 7. |

25. The computer program product of claim 24, wherein the at least half of the divided plurality of tones comprises odd-numbered tones.

26. The computer program product of claim 24, wherein the divided plurality of tones over which the pilot signals are transmitted are changed by the fixed offset of eight tones from symbol to symbol for of the divided plurality of tones.

27. The computer program product of claim 26, wherein the non-transitory computer-readable medium further comprises code for dividing the thirteen symbols into a plurality of groups.

28. The computer program product of claim 27, wherein the non-transitory computer-readable medium further comprises code for transmitting the pilot signals during symbols of a first group of the plurality of groups, wherein channel estimation is performed based on the first group of the plurality of groups.

29. The computer program product of claim 26, wherein one of the thirteen symbols is repeated after the thirteen symbols.

30. The computer program product of claim 26, wherein the non-transitory computer-readable medium further comprises code for transmitting the thirteen symbols sequentially and in a round robin fashion.

31. The computer program product of claim 26, wherein the plurality of tones are divided among the thirteen symbols based on at least one of the following criteria:
  maximizing intra-symbol distances between the tones, or
  maximizing inter-symbol distances between the tones.

* * * * *